(12) United States Patent
Saito et al.

(10) Patent No.: US 11,446,844 B2
(45) Date of Patent: Sep. 20, 2022

(54) KNEADING DEVICE WITH A DETECTION UNIT DETECTING A DISPERSION DEGREE

(71) Applicant: NIHON SPINDLE MANUFACTURING CO., LTD., Hyogo (JP)

(72) Inventors: Hisashi Saito, Hyogo (JP); Yoshihiko Nagata, Hyogo (JP); Takamasa Kishima, Hyogo (JP)

(73) Assignee: NIHON SPINDLE MANUFACTURING CO., LTD., Hyogo (JP)

( * ) Notice: Subject to any disclaimer, the term of this patent is extended or adjusted under 35 U.S.C. 154(b) by 128 days.

(21) Appl. No.: 16/700,540

(22) Filed: Dec. 2, 2019

(65) Prior Publication Data

US 2020/0101640 A1    Apr. 2, 2020

Related U.S. Application Data

(63) Continuation of application No. PCT/JP2018/013322, filed on Mar. 29, 2018.

(30) Foreign Application Priority Data

Jun. 6, 2017  (JP) .............................. JP2017-111682
Jun. 6, 2017  (JP) .............................. JP2017-111683

(51) Int. Cl.
*B29B 7/18* (2006.01)
*B29B 7/28* (2006.01)
*B29B 7/74* (2006.01)

(52) U.S. Cl.
CPC .............. *B29B 7/186* (2013.01); *B29B 7/183* (2013.01); *B29B 7/28* (2013.01); *B29B 7/286* (2013.01); *B29B 7/7495* (2013.01)

(58) Field of Classification Search
CPC ......... B29B 7/186; B29B 7/28; B29B 7/7495; B29B 7/826; B29B 7/823; B29B 7/283;
(Continued)

(56) References Cited

U.S. PATENT DOCUMENTS 3,870,283 A * 3/1975 Hurst .................... B01F 5/0074
                                                 366/143
5,865,535 A * 2/1999 Edwards ................. B29B 7/246
                                                 366/601
6,913,379 B2    7/2005 Otsuka et al.
(Continued)

FOREIGN PATENT DOCUMENTS

CN      2 382 535 Y      6/2000
JP      S51-093471 A     8/1976
(Continued)

OTHER PUBLICATIONS

Search Report issued in European Application No. 18813287.2, dated Apr. 29, 2020.

*Primary Examiner* — Charles Cooley
(74) *Attorney, Agent, or Firm* — Michael Best & Friedrich LLP

(57) ABSTRACT

A kneading device for dispersing a dispersoid in a dispersion medium includes a casing in which a kneading material containing the dispersion medium and the dispersoid is accommodated, a rotor disposed in the casing and kneading the kneading material while dispersing the dispersoid in the dispersion medium by rotating about a rotation axis, and a detection unit detecting a dispersion degree of the dispersoid in the dispersion medium by observing a state of the kneading material in the casing.

20 Claims, 12 Drawing Sheets

(58) Field of Classification Search
CPC ........ B29B 7/286; B29B 7/183; G01N 27/04; G01N 23/00; G01N 21/55; G01N 2021/8411
USPC .......................................... 366/143, 69–100
See application file for complete search history.

(56) References Cited

U.S. PATENT DOCUMENTS

| | | | | |
|---|---|---|---|---|
| 7,075,645 | B2* | 7/2006 | Gehrlein | ................ B01F 9/005 356/328 |
| 8,967,851 | B1* | 3/2015 | Kemeny | ................ B01F 29/60 366/142 |
| 10,322,527 | B2* | 6/2019 | Manabe | ................ B29B 7/283 |
| 2017/0225339 | A1 | 8/2017 | Manabe et al. | |
| 2020/0101640 | A1* | 4/2020 | Saito | ........................ B29B 7/28 |
| 2020/0306707 | A1* | 10/2020 | Saito | ..................... B01F 15/065 |

FOREIGN PATENT DOCUMENTS

| | | | |
|---|---|---|---|
| JP | S52-103478 A | 8/1977 | |
| JP | S58-008543 A | 1/1983 | |
| JP | H02-235715 A | 9/1990 | |
| JP | H06-000865 A | 1/1994 | |
| JP | H07-214538 A | 8/1995 | |
| JP | 2000-167372 A | 6/2000 | |
| JP | 2000-280239 A | 10/2000 | |
| JP | 3574618 B2 | 10/2004 | |
| JP | 2015-155148 A | 8/2015 | |
| JP | 2016-179643 A | 10/2016 | |
| JP | 2017-077649 A | 4/2017 | |
| JP | 2017-083322 A | 5/2017 | |
| JP | 2018202762 A * | 12/2018 | ........... B29B 7/7495 |
| WO | 2016/024435 A1 | 2/2016 | |
| WO | WO-2017073137 A1 * | 5/2017 | ............. G01B 11/02 |

* cited by examiner

KNEADING DEVICE WITH A DETECTION UNIT DETECTING A DISPERSION DEGREE

RELATED APPLICATIONS

The contents of Japanese Patent Application No. 2017-111682, Japanese Patent Application No. 2017-111683, and of International Patent Application No. PCT/JP2018/013322, on the basis of each of which priority benefits are claimed in an accompanying application data sheet, are in their entirety incorporated herein by reference.

BACKGROUND

Technical Field

Certain embodiments of the present invention relate to a kneading device for dispersing a dispersoid in a dispersion medium.

Description of Related Art

A closed kneader is known as a device kneading a viscous material such as plastic and rubber. For example, the related art discloses a closed kneader including a casing accommodating a kneading material, a pressurizing lid blocking the upper portion of the casing, and a pair of rotors attached in the casing.

SUMMARY

In a characteristic configuration of a kneading device according to the present invention, the kneading device disperses a dispersoid in a dispersion medium and includes a casing in which a kneading material containing the dispersion medium and the dispersoid is accommodated, a rotor disposed in the casing and kneading the kneading material while dispersing the dispersoid in the dispersion medium by rotating about a rotation axis, and a detection unit detecting a dispersion degree of the dispersoid into the dispersion medium by observing a state of the kneading material in the casing.

DETAILED DESCRIPTION

In many cases of kneading by means of the closed kneader, kneading time, the temperature of the kneading material, and integrated power are used and these factors are combined for reaching a predetermined value to be used as a kneading end condition so that kneading reproducibility is ensured. However, the kneading time, the temperature of the kneading material, and the integrated power are not data directly representing the state of the material but indirect data. For example, the position of the material in the casing causes the load applied to the rotor to fluctuate. As a result, the integrated power of rotor drive does not correlate with the actual state of the material in some cases. In other words, control based on indirect data such as integrated power is unlikely to result in kneading quality stabilization.

According to an embodiment of the present invention, it is desirable to stabilize kneading quality by detecting the dispersion degree of a kneading material.

According to the characteristic configuration described above, it is possible to stabilize kneading quality by detecting the dispersion degree.

Overview of Present Embodiment

A kneading device according to one embodiment and another embodiment described below kneads a kneading material containing a dispersion medium and a dispersoid charged in a casing. The kneading device applies an electromagnetic method to the kneading material in the casing and observes the state of the kneading material. Here, the state of the kneading material includes the surface state of the kneading material and the internal state of the kneading material. The kneading device can be used for kneading quality stabilization by the state of the kneading material being directly observed as described above and a dispersion degree being detected as a result.

It is possible to detect the dispersion degree by, for example, detecting electromagnetic waves from the kneading material and observing the surface state of the kneading material, the internal state of the kneading material, or the like. Examples of the electromagnetic waves observed in this case include electromagnetic waves emitted to the surface of the kneading material and reflected from the surface of the kneading material and electromagnetic waves from the kneading material itself that are radiated from the surface and the inner portion of the kneading material. A method for detecting the dispersion degree will be described in the following one embodiment.

In addition, the ease of current flow (electrical resistance) through at least one of the surface and the inner portion of the kneading material varies with, for example, the dispersion degree of the dispersoid into the dispersion medium. A method for detecting the dispersion degree will be described in the following another embodiment.

One Embodiment

Figure 1:
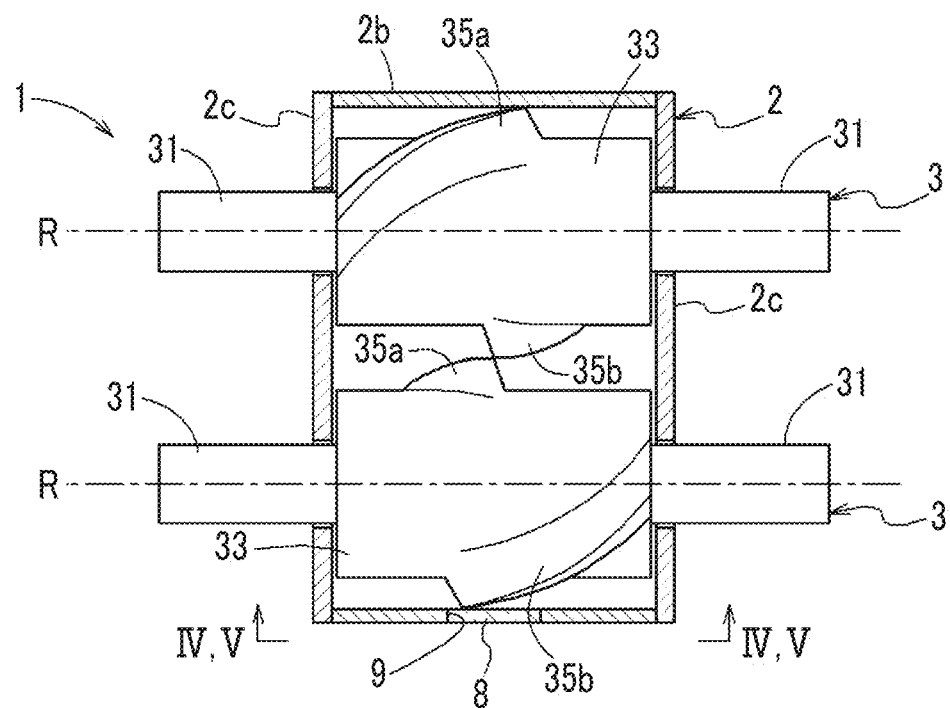
FIG. 1 is a top view illustrating a schematic configuration of a kneading device.
Figure 2:
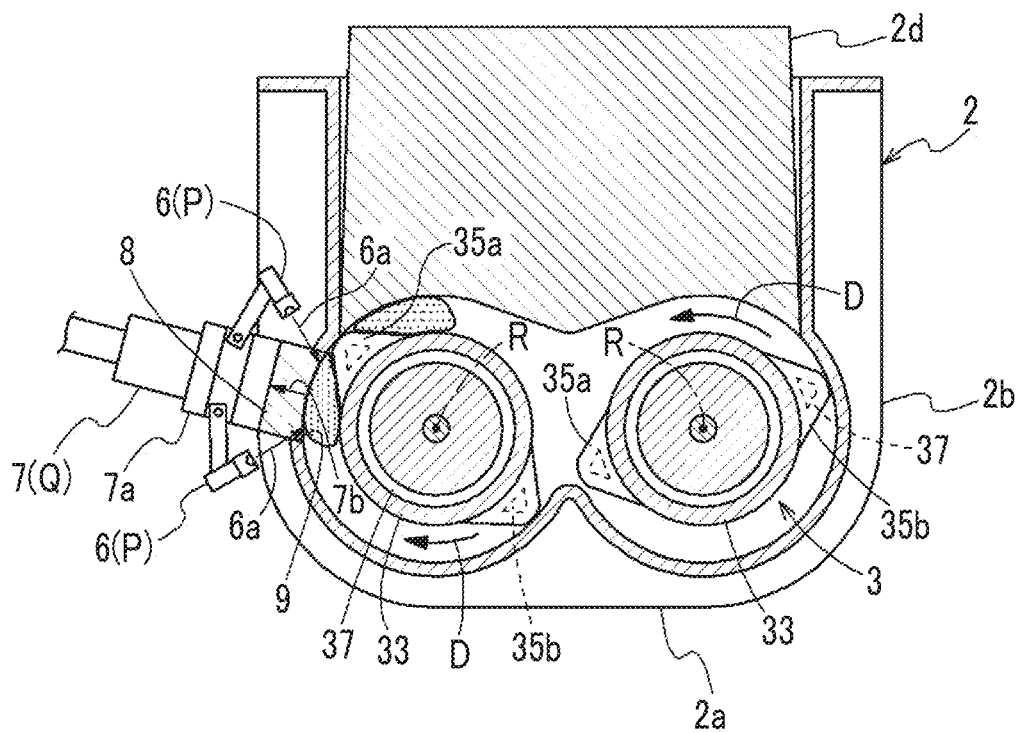
FIG. 2 is a cross-sectional view illustrating a schematic configuration of the kneading device.
Figure 3:
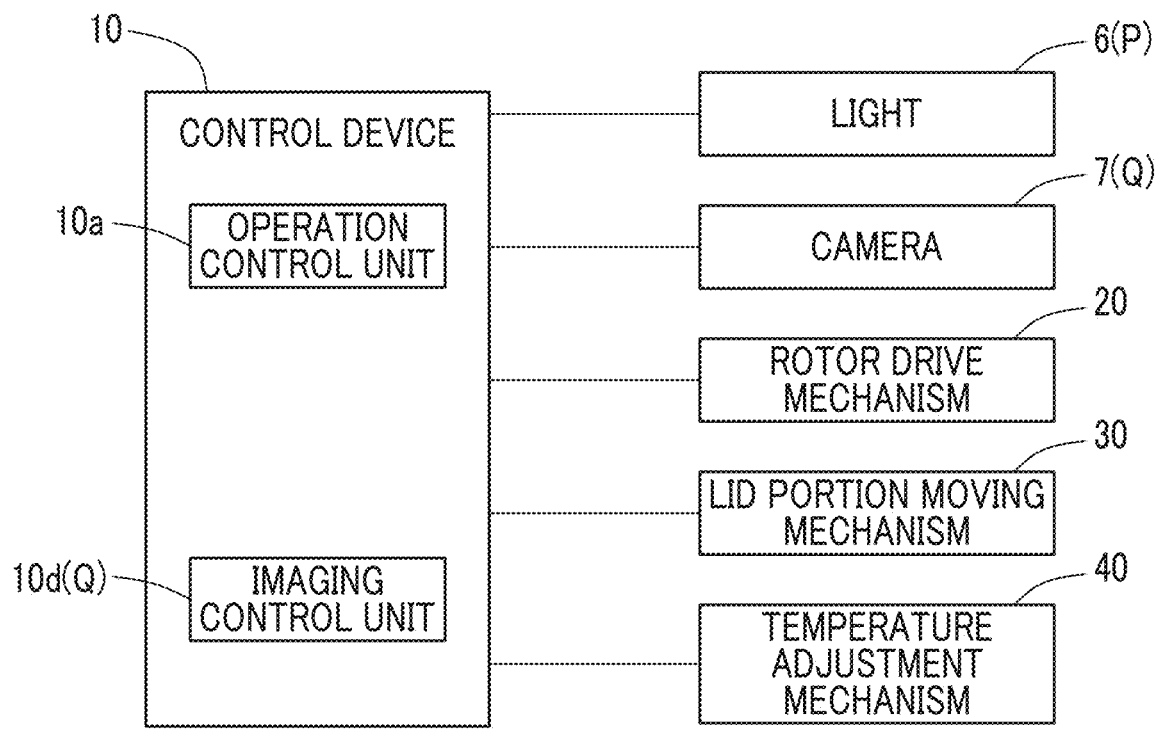
FIG. 3 is a block diagram illustrating a schematic configuration of the kneading device.

Hereinafter, a kneading device 1 according to the one embodiment will be described with reference to FIGS. 1 to 3. As illustrated in FIG. 1 and FIG. 2, the kneading device 1 is provided with a casing 2 in which a polymer material (dispersion medium) and a dispersoid are accommodated, a pair of rotors 3 disposed in the casing 2, an electromagnetic wave irradiation unit (irradiation unit) P (light 6), and a dispersion degree detection unit (detection unit) Q. As illustrated in FIG. 3, the kneading device 1 is provided with a control device 10, a rotor drive mechanism 20, a lid portion moving mechanism 30, and a temperature adjustment mechanism 40. A camera (imaging unit) 7 and an imaging control unit 10d constitute the dispersion degree detection unit Q. In the following description, the polymer material and the dispersoid in the casing 2 may be collectively referred to as "kneading material" or "material".

The casing 2 is a tank-shaped member in which the polymer material and the dispersoid are accommodated and kneaded. The inner portion of the casing 2 has a shape in which a pair of columns having parallel center axes (rotation axes R) is disposed in a state where side surfaces of the columns partially overlap each other. The pair of rotors 3 is rotatably disposed in the casing 2 in a state where the rotation axes R coincide with the center axes of the columns.

The casing 2 is configured to include a bottom portion 2a, a cylindrical portion 2b, a side wall portion 2c, and a lid portion 2d. The bottom portion 2a is the bottom part of the casing 2. The cylindrical portion 2b covers the periphery of the pair of rotors 3 in the casing 2. The side wall portion 2c, which is the side wall of the casing 2, is disposed so as to be perpendicular to the rotation axis of the rotor 3. The lid portion 2d is the lid part of the casing 2.

The lid portion 2d is disposed with respect to the casing 2 in a state where the lid portion 2d can be moved upward and downward by the lid portion moving mechanism 30 (not illustrated). The kneading material (polymer material and dispersoid) is charged into the casing 2 in a state where the lid portion 2d is moved upward and the upper portion of the casing 2 is open. Subsequently, the lid portion 2d is moved downward and the kneading material is kneaded by the rotor 3 being rotated while the charged kneading material is pressurized from above. Specifically, the lid portion moving mechanism 30 is configured to include an actuator such as an electric motor and an air cylinder.

The rotor 3 includes a support portion 31 rotatably supporting the rotor 3 in the through-hole of the side wall portion 2c, a shaft portion 33 larger in diameter than the support portion 31, and blade portions 35a and 35b formed in a helical shape on the surface of the shaft portion 33. The blade portions 35a and 35b are formed from both side end portions of the shaft portion 33 toward the other end side over substantially the middle of the shaft portion 33. The blade portions 35a and 35b are tangent-type blade portions that do not overlap each other between the pair of rotors 3 facing each other. The rotor 3 is rotationally driven in a predetermined rotation direction D around the rotation axis R by the rotor drive mechanism 20 (not illustrated). Specifically, the rotor drive mechanism 20 is configured to include an electric motor. Although the pair of rotors 3 is disposed in the casing 2, the rotors 3 rotate in opposite directions.

The rotor 3 includes a temperature control flow path 37 therein. The temperature control flow path 37 is a flow path through which cooling water flows and is formed in the shaft portion 33 and the blade portions 35a and 35b of the rotor 3. The temperature control flow path 37 is connected to the temperature adjustment mechanism 40 (not illustrated) and the cooling water is supplied from the temperature adjustment mechanism 40 to the temperature control flow path 37. Although the kneading material generates heat in response to the action of shearing, deformation, or the like when the kneading material is kneaded by the kneading device 1, the rotor 3 is cooled by the cooling water flowing through the temperature control flow path 37 and the kneading material in contact with the rotor 3 is cooled. In other words, the temperature adjustment mechanism 40 controls the temperature of the rotor 3 and the temperature of the kneading material. Specifically, the temperature adjustment mechanism 40 is configured to include an electric pump delivering the cooling water to the temperature control flow path 37.

As illustrated in FIG. 2, the light 6 and the camera 7 are disposed outside the casing 2 and a transmission window 8 is disposed in the cylindrical portion 2b of the casing 2. Specifically, the cylindrical portion 2b has a through-hole 9 penetrating the cylindrical portion 2b from the outer side to the inner side. The transmission window 8 is fitted in the through-hole 9. Electromagnetic waves from the light 6 are emitted from the transmission window 8 to the kneading material.

The transmission window 8 is formed of a material that transmits electromagnetic waves. For example, the transmission window 8 is a member made of glass. The surface of the transmission window 8 that is on the rotor 3 side is a curved surface along the inner surface shape of the cylindrical portion 2b of the casing 2. Abrasion- and scratch-proof coating may be applied to the inside of the transmission window 8 (side where the kneading material is positioned).

In addition, processing (coating) for preventing the kneading material from adhering may be performed on the surface of the transmission window 8 that is on the rotor 3 side (region facing the inner portion of the casing 2). As a result, it is possible to prevent the kneading material from adhering to the surface of the transmission window 8 that is on the rotor 3 side. Accordingly, the camera 7 (described later) is capable of imaging the kneading material in the casing 2 via the transmission window 8 without being blocked by the kneading material.

Figure 9:
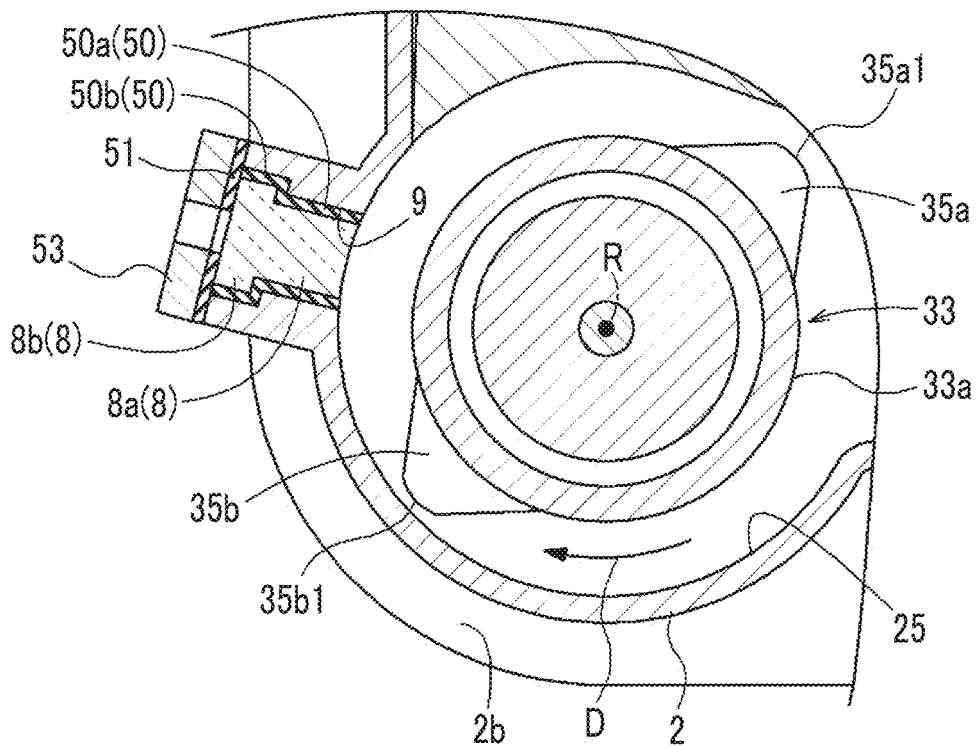
FIG. 9 is a cross-sectional view illustrating a protection member provided between a casing and a transmission window.

As illustrated in FIG. 9, which will be described later, the shape of the outer edge of an inner surface 25 of the casing 2 and the shape of the outer edge of the transmission window 8 facing the inner portion of the casing 2 coincide with each other in an arc shape. Accordingly, the inner surface of the transmission window 8 can be configured to be along the inner surface 25 of the casing 2. This is preferable because the kneading of the kneading material is not affected when the inner surface 25 of the casing 2 and the surface of the transmission window 8 facing the inner portion of the casing 2 are substantially flush. In addition, this is preferable because it is possible to suppress the transmission window 8 being lost by receiving pressure from the kneading material.

The camera 7 (a part of the dispersion degree detection unit Q) observes the electromagnetic waves emitted from the light 6 and reflected from the kneading material in the casing 2. Specifically, the camera 7 acquires a captured image by imaging the kneading material in the casing 2. The operation of the camera 7 is controlled by the control device 10. The captured image is transmitted to the control device 10. The captured image acquired by the camera 7 may be a still image or a moving image. The camera 7 is provided with a magnifying lens 7a and is capable of imaging the kneading material in a magnified manner for dispersion state clarification.

As described above, electromagnetic waves are emitted from the light 6 via the transmission window 8 and the camera 7 images the electromagnetic waves reflected from the kneading material via the transmission window 8. Accordingly, the electromagnetic waves from the kneading material can be imaged by the camera 7 in a state where the casing 2 is sealed. Accordingly, it is possible to detect the dispersion degree without kneading interruption while kneading the kneading material in the casing 2.

As illustrated in FIG. 2, in the one embodiment, the camera 7 is disposed outside the transmission window 8. The camera 7 is directed in the diameter direction of the rotor 3, which is perpendicular to the surface of the kneading material. In other words, an electromagnetic wave observation direction 7b of the camera 7 is directed in the diameter direction of the rotor 3, which is perpendicular to the surface of the kneading material.

The light 6 (electromagnetic wave irradiation unit P) irradiates the kneading material in the casing 2 with electromagnetic waves. The light 6 is, for example, a white LED light source. The operation of the light 6 is controlled by the control device 10. As illustrated in FIG. 2, in the one embodiment, the light 6 is disposed on the side surface of the transmission window 8. The light 6 is directed obliquely with respect to the surface of the kneading material. In other words, an electromagnetic wave irradiating direction 6a of the light 6 is directed obliquely with respect to the surface of the kneading material. Accordingly, in the one embodiment, the electromagnetic wave irradiating direction 6a of the light 6 (electromagnetic wave irradiation unit P) and the electromagnetic wave observation direction 7b of the camera 7 (dispersion degree detection unit Q) are not parallel to each other. In other words, the electromagnetic wave irradiating direction intersects with the electromagnetic wave observation direction.

For example, in a case where the kneading state of the kneading material is in progress and the dispersion degree of the dispersoid into the polymer material is small, the electromagnetic waves emitted to the surface of the kneading material are highly scattered or the like by the protrusion of the dispersoid. Even in such cases, the electromagnetic wave observation direction is different from the electromagnetic wave irradiating direction, and thus it is possible to efficiently observe the electromagnetic waves reflected by the surface of the kneading material.

The angle that is formed by the irradiating direction 6a of the light 6 and the surface of the kneading material is preferably 20° or more, preferably 40° or less, and more preferably approximately 30°. In the one embodiment, one light 6 is disposed on each of the upstream side and the downstream side of the transmission window (window) 8 in relation to the rotation direction D of the rotor 3.

The electromagnetic waves emitted to the kneading material by the light 6 and the electromagnetic waves from the kneading material observed by the dispersion degree detection unit Q (camera 7) are not limited in terms of intensity and wavelength insofar as the dispersion degree can be detected by the dispersion degree detection unit Q. The electromagnetic waves may be, for example, visible light, far infrared rays, near infrared rays, ultraviolet rays, radio waves such as microwaves, short waves, and long waves, or X-rays. The electromagnetic waves (or light) emitted by the light 6 and detected by the dispersion degree detection unit Q may have a single wavelength.

The control device 10 controls the overall operation of the kneading device 1. In the one embodiment, the control device 10 is configured to include an operation control unit (control unit) 10a and the imaging control unit 10d (dispersion degree detection unit Q). Specifically, the control device 10 is configured to include a storage device such as a hard disk drive (HDD) and a nonvolatile random access memory (RAM), a central processing unit (CPU), and the like. The control device 10 is connected to the light 6, the camera 7, the rotor drive mechanism 20, the lid portion moving mechanism 30, and the temperature adjustment mechanism 40 and controls each mechanism.

The operation control unit 10a controls the operation of the kneading device 1 based on the dispersion degree detected by the imaging control unit 10d (dispersion degree detection unit Q, described later). Specifically, the operation control unit 10a controls the rotating speed of the rotor 3 by controlling the rotor drive mechanism 20. In addition, the operation control unit 10a controls the pressurizing force with which the lid portion 2d presses the kneading material in the casing 2 by controlling the lid portion moving mechanism 30. In addition, the operation control unit 10a controls the temperature of the kneading material in the casing 2 by controlling the temperature adjustment mechanism 40. As a result, the quality of the kneading can be stabilized based on the result of the direct kneading material observation.

Specifically, the operation control unit 10a controls the operation of the kneading device 1 based on the difference between the dispersion degree detected by the imaging control unit 10d (dispersion degree detection unit Q) and a target value of the dispersion degree. The target value of the dispersion degree is, for example, a target value of the dispersion degree at each time during the kneading. For example, in a case where the dispersion degree detected at a certain time t is below the target value of the dispersion degree at the time t, the rotating speed of the rotor or the like is increased so that the dispersion degree is further increased. For example, in a case where the dispersion degree detected at a certain time t exceeds the target value of the dispersion degree at the time t, the rotating speed of the rotor or the like is decreased so that an increase in the dispersion degree is suppressed. In other words, the operation control unit 10a feedback-controls the operation of the kneading device 1 based on the difference between the detected dispersion degree and the target value of the dispersion degree.

After the dispersion degree detected by the imaging control unit 10d (dispersion degree detection unit Q) reaches a predetermined threshold, the operation control unit 10a ends the kneading operation by stopping the rotor 3 by controlling the rotor drive mechanism 20. The following modes are also possible regarding the ending of the kneading operation. The operation control unit 10a ends the kneading operation by stopping the rotor 3 by controlling the rotor drive mechanism 20 after the time change rate of the dispersion degree detected by the dispersion degree detection unit Q reaches a predetermined threshold.

In addition, the operation control unit 10a decreases the rotating speed of the rotor 3 when the camera 7 of the dispersion degree detection unit Q images the kneading material. Specifically, the operation control unit 10a decreases the rotating speed of the rotor 3 by controlling the rotor drive mechanism 20 once the imaging control unit 10d notifies the operation control unit 10a that the kneading material is imaged. The rotating speed of the rotor 3 may be decreased by, for example, 30% or 50%. Alternatively, the rotating speed may be decreased by 100%. In other words, the rotor 3 may be stopped. As a result, a clear captured image can be acquired and the dispersion degree can be reliably detected.

The imaging control unit 10d (dispersion degree detection unit Q) detects the dispersion degree of the dispersoid into the polymer material by observing electromagnetic waves from the kneading material in the casing 2. Specifically, the imaging control unit 10d detects the dispersion degree by observing the protrusion on the surface of the kneading material from the captured image acquired by the camera 7 imaging the kneading material in the casing 2. Hereinafter, the operation of the imaging control unit 10d will be described in detail.

The imaging control unit 10d acquires a captured image by imaging the kneading material in the casing 2 by controlling the camera 7. It is preferable that the imaging is performed when the kneading material is positioned in front of the transmission window 8. It is particularly preferable that the imaging is performed after the blade portions 35a and 35b have passed. Specifically, the imaging control unit 10d monitors the rotation of the rotor 3 through the operation control unit 10a and the imaging control unit 10d causes the camera 7 to perform the imaging and acquires the captured image immediately after the passage of the blade portions 35a and 35b in front of the camera 7 (that is, in front of the transmission window 8).

The dispersoid is exposed and appears as the protrusion on the surface of the kneading material in the casing 2. In the captured image of the kneading material acquired by the camera 7, the dispersoid exposed on the surface appears as a high-luminance region, that is, a white region. The imaging control unit 10d performs various types of image processing such as binarization on the obtained image and calculates, for example, the size and the number of the dispersoid. Then, the dispersion degree is detected based on, for example, the size and the number of the dispersoid obtained from the captured image.

For example, the dispersion of the dispersoid into the polymer material proceeds and the surface of the kneading material becomes smooth once the kneading material is kneaded to some extent. In this case, the surface of the kneading material has little unevenness, and thus the number of the high-luminance region being small is detected from the captured image of the electromagnetic waves reflected from the kneading material. In this case, it can be detected that the dispersion degree is large. In contrast, in a case where the surface of the kneading material has a large number of protrusions where the dispersoid is exposed, for example, it can be seen that the surface of the kneading material is rough and the kneading of the kneading material is yet to proceed. In this case, the surface of the kneading material has a lot of unevenness, and thus the number of the high-luminance region being large is detected from the captured image of the electromagnetic waves reflected from the kneading material. In this case, it can be detected that the dispersion degree is small. It is conceivable that an increase in the luminance is because, for example, the electromagnetic waves emitted to the kneading material are scattered, refracted, reflected, diffracted, and interfered by the protrusion of the dispersoid.

The dispersion degree is the dispersion degree of the dispersoid into the polymer material. The dispersion degree may be, for example, a numerical value, a percentage, or a stepwise index (such as low, medium, and high dispersion degrees). For example, the dispersion degree may be the number or the presence or absence of a dispersoid mass (aggregate) having a certain size or the maximum value of the size of the dispersoid mass that is present.

Modification Examples

The configuration disclosed in the above-described one embodiment (including the modification examples, the same applies hereinafter) can be applied in combination with the configuration disclosed in the modification examples insofar as no contradiction arises. In addition, the embodiment disclosed in this specification is an example, the embodiment of the present invention is not limited thereto, and the embodiment can be appropriately modified without departing from the object of the present invention.

<1> Although the dispersion degree is detected based on the electromagnetic waves reflected from the kneading material in the one embodiment described above, the method for detecting the dispersion degree will be further considered below. The state of the kneading material is affected by the kneading by the blade portion 35 when the dispersion degree is detected. Accordingly, the configuration of the blade portion 35 will be described first.

(1) Configuration of Blade Portion

Figure 4:
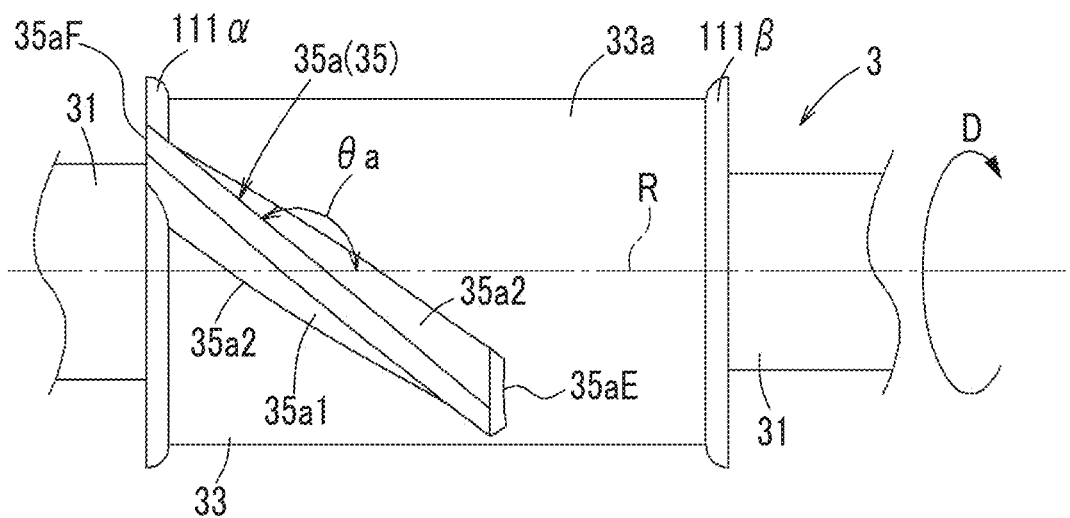
FIG. 4 is a view taken along arrow IV-IV in FIG. 1.
Figure 5:
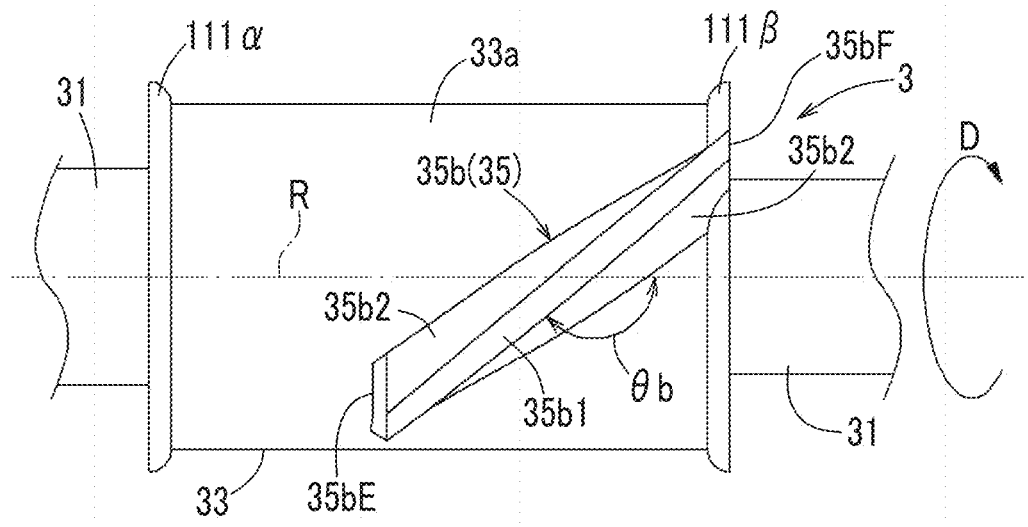
FIG. 5 is a view taken along arrow V-V in FIG. 1.

An example of the configuration of the blade portion 35 will be described with reference to FIGS. 1, 4, 5, and so on. As illustrated in FIGS. 1, 4, 5, and so on, an outer peripheral surface (surface) 33a of the shaft portion 33 is provided with the two blade portions 35a and 35b having different twist directions. FIGS. 4 and 5 are views taken along arrows IV-IV and V-V in FIG. 1. Once the shaft portion 33 rotates along the rotation direction D, the state of FIG. 5 in which the blade portion 35b is seen is obtained from FIG. 4 in which the blade portion 35a is seen.

As illustrated in FIG. 4, the blade portion 35a extends from a starting end 35aF of an outer peripheral end portion (first end portion) 111α toward an outer peripheral end portion (second end portion) 111β so as to be longer than the middle portion of the shaft portion 33. The blade portion 35a includes a top surface 35a1 protruding most from the outer peripheral surface 33a of the shaft portion 33 and inclined surfaces 35a2 on both sides directed from the top surface 35a1 toward the outer peripheral surface 33a. The blade portion 35a extends in an oblique direction that forms an angle θa with respect to the rotation axis R.

As illustrated in FIG. 5, the blade portion 35b includes a top surface 35b1 and inclined surfaces 35b2 on both sides of the top surface 35b1. The blade portion 35b extends in an oblique direction that forms an angle θb with respect to the rotation axis R. For example, the angle θb has a relationship of $\theta b \cong -\theta a$.

As described above, the blade portion 35a and the blade portion 35b have different twist directions with respect to the rotation axis R. Accordingly, the kneading material can be efficiently kneaded by being kneaded from various directions by both the blade portion 35a and the blade portion 35b. In addition, by the blade portions 35a and 35b being configured as described above, the kneading material is kneaded such that the kneading material is collected in the middle portion of the rotor 3 where the end portions of the blade portion 35a and the blade portion 35b are in proximity to each other in the direction of the rotation axis R.

(2) Detection of Dispersion Degree

Figure 6:
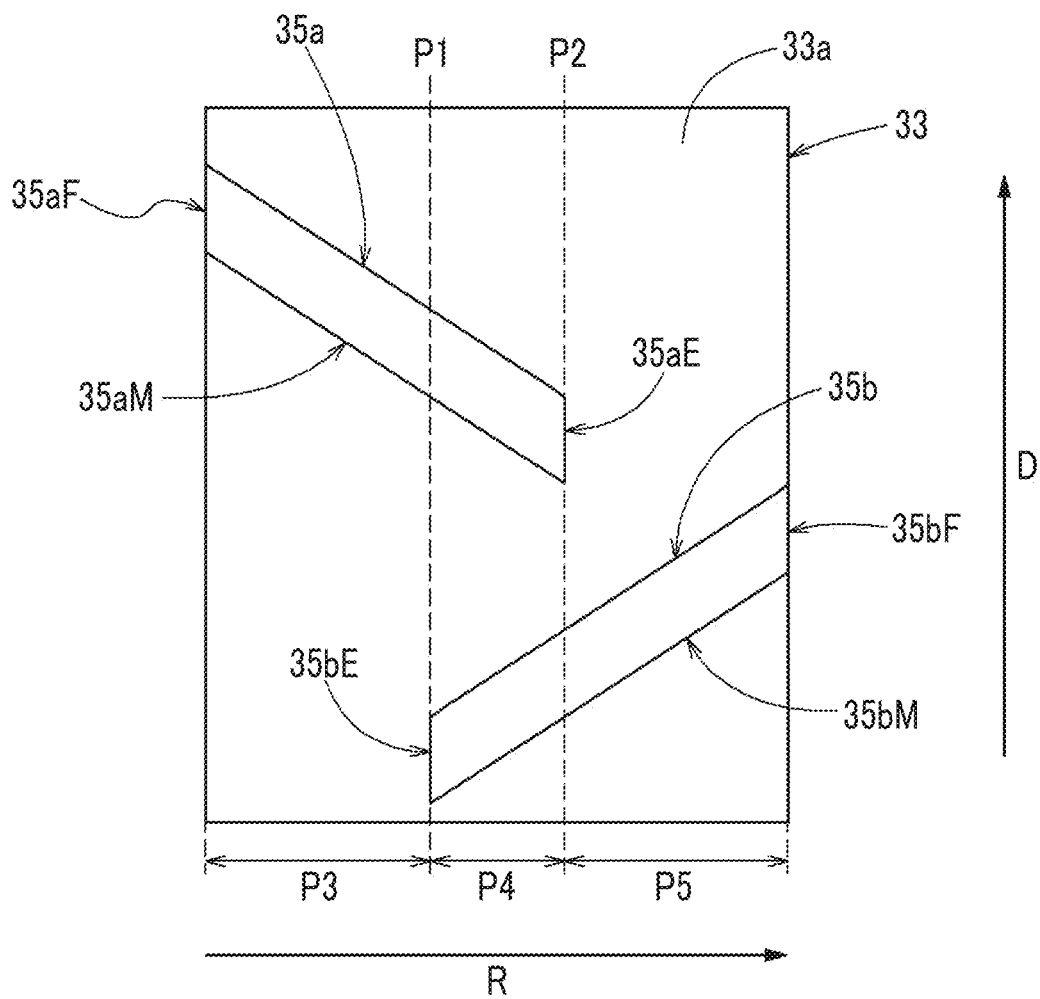
FIG. 6 is a developed schematic view of a shaft portion illustrating dispersion degree detection in a case where blade portions have substantially the same length.

Next, the detection of the dispersion degree of the kneading material will be described with reference to FIGS. 6 to 8.

(2-1) Disposition Position of Camera

The disposition position of the camera (imaging unit) 7 with respect to the casing 2 will be described first. FIG. 6 and so on are developed schematic views of the shaft portion 33. The shaft portion 33 can be divided into the regions of a position P3, a position P4, and a position P5 in the direction of the rotation axis R. The position P3 is positioned on the blade portion 35a side and only the blade portion 35a corresponds to the position P3. The position P5 is positioned on the blade portion 35b side and only the blade portion 35b corresponds to the position P5. At the position P4, the blade portion 35a and the blade portion 35b overlap each other in the rotation direction D. The boundary between the position P3 and the position P4 is a position P1 and the boundary between the position P4 and the position P5 is a position P2.

The camera 7 is disposed in the casing 2 so as to correspond to at least one of the positions P1 to P5. Here, in a case where the camera 7 is disposed so as to correspond to the position P3, the camera 7 is capable of imaging the electromagnetic waves from the kneading material in the blade portion 35a. In a case where the camera 7 is disposed so as to correspond to the position P1, the position P2, and the position P4, the camera 7 is capable of imaging the electromagnetic waves from the kneading material in both the blade portion 35a and the blade portion 35b. In a case where the camera 7 is disposed so as to correspond to the position P5, the camera 7 is capable of imaging the electromagnetic waves from the kneading material in the blade portion 35b. Accordingly, the positions P1, P2, and P4 are preferable as the disposition position of the camera.

(2-2) Dispersion Degree Detection Timing

Next, the timing of the dispersion degree detection by the dispersion degree detection unit Q (including the camera 7 and the imaging control unit 10d) will be described. Here, the shaft portion 33 is provided with the blade portions 35a and 35b having the same length as illustrated in FIGS. 1, 4, 5, and so on. As illustrated in FIG. 6 and (i) of FIG. 7, which are development views of the shaft portion 33, the blade portion 35a is directed upward from a terminal end 35aE toward the starting end 35aF. Likewise, the blade portion 35b is directed upward from a terminal end 35bE toward a starting end 35bF. In the development views including FIG. 6 and (i) of FIG. 7, the predetermined rotation direction D of the shaft portion 33 is directed upward from below.

Once the polymer material and the dispersoid are charged into the casing 2 and the rotor 3 rotates in the rotation direction D, the kneading material on the blade portion 35a side is directed toward the terminal end 35aE and the kneading material on the blade portion 35b side is directed toward the terminal end 35bE. Further, by the rotor 3 rotating, the kneading material moves between the blade portion 35a and the blade portion 35b and is kneaded by, for example, moving to the adjacent rotor 3.

Figure 7:
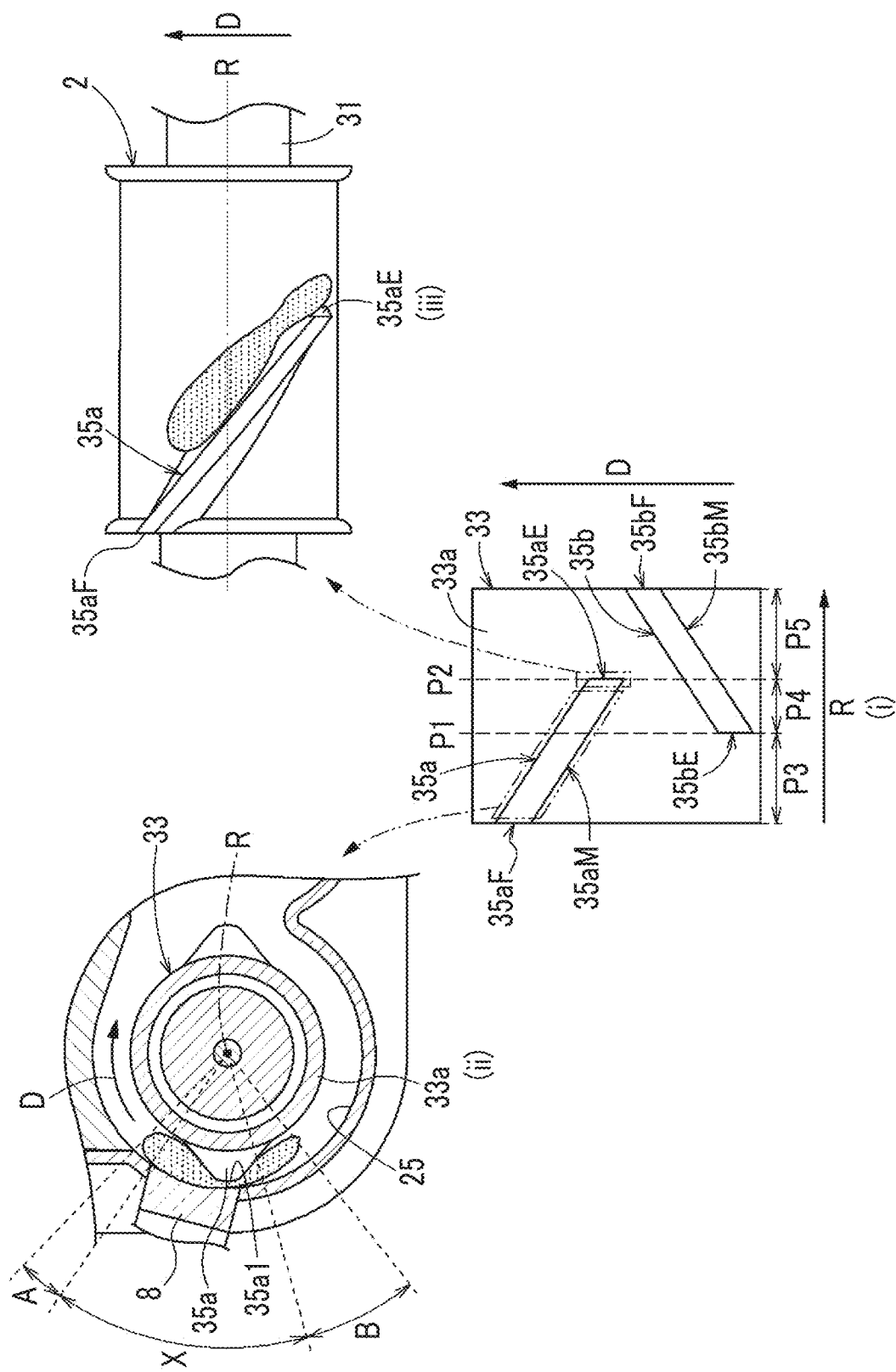
FIG. 7 is a schematic view illustrating a state of the kneading material.

Here, the kneading material is put into the state that is illustrated in (ii) of FIG. 7 in a case where the kneading material is positioned in an intermediate portion 35aM between the starting end 35aF and the terminal end 35aE of the blade portion 35a (position excluding the starting end 35aF and the terminal end 35aE in the blade portion 35a) as illustrated in (i) of FIG. 7. In other words, in the place where the top surface 35a1 of the blade portion 35a and the inner surface 25 of the casing 2 (or the inner surface of the transmission window 8) are in proximity to each other, the surface of the kneading material is pressed by a high pressure and the unevenness of the surface of the kneading material is crushed (hereinafter, referred to as a proximity pressing state (timing X in (ii) of FIG. 7)). Accordingly, the kneading state of the kneading material cannot be accurately identified even when the surface state of the kneading material is imaged.

The dispersion degree detection unit Q detects the dispersion degree of the kneading material not at the timing X, which is the proximity pressing state, but in a state where the degree of pressing of the kneading material is relatively small and the dispersoid is likely to appear on the surface of the kneading material. Specifically, in a case where the kneading material is positioned in the intermediate portion 35aM as illustrated in (i) of FIG. 7, the dispersion degree detection unit Q detects the dispersion degree of the kneading material based on at least one of a timing A preceding the passage of the top surface 35a1 of the blade portion 35a through the transmission window 8 and a timing B following the passage of the blade portion 35a through the transmission window 8 as illustrated in (ii) of FIG. 7. At the timing A preceding the passage of the blade portion 35a through the transmission window 8, the kneading material is attached to the blade portion 35a away from the inner surface 25 of the casing 2 and receives a pressing force smaller than in the proximity pressing state. The same applies to the kneading material at the timing B.

In a case where the kneading material is positioned in the terminal end 35aE of the blade portion 35a as illustrated in (i) of FIG. 7, the kneading material is separated from the terminal end 35aE and moves to the side without the blade portion 35a as illustrated in (iii) of FIG. 7. In this case, the kneading material comes out of the proximity pressing state and is put into a state where pressing between the outer peripheral surface 33a of the shaft portion 33 and the inner surface 25 of the casing 2 is relatively small. Accordingly, the dispersion degree detection unit Q may detect the dispersion degree of the kneading material based on a timing C, at which the terminal end 35aE of the blade portion 35a passes through the transmission window 8. In addition, the dispersion degree detection unit Q is capable of detecting the dispersion degree of the kneading material at the timings A and B with regard to the terminal end 35aE of the blade portion 35a. In other words, the dispersion degree may be detected at any of the timings A, B, and C with regard to the terminal end 35aE of the blade portion 35a. In this manner, the dispersion degree can be accurately detected by the surface state of the kneading material being directly observed.

Here, for example, the timings at which the camera 7 images the kneading material may be set to the predetermined timings A to C and the imaging control unit 10d may detect the dispersion degree based on the captured images captured at the timings A to C. Alternatively, for example, the camera 7 may image the kneading material at all times and the imaging control unit 10d may detect the dispersion degree by extracting the captured images at the predetermined timings A to C. Although the detection timing of the dispersion degree by the blade portion 35a has been described above, the same applies to the blade portion 35b.

How the state of the kneading material can be imaged in a case where the camera 7 is disposed at any of the positions P1 to P5 will be further described below. As illustrated in FIGS. 6 and 7, a part of the intermediate portion 35aM of the blade portion 35a and the terminal end 35bE of the blade portion 35b are positioned at the position P1 in the rotation direction D of the rotor 3. It is assumed that the camera 7 is disposed so as to correspond to the position P1. In this case, the dispersion degree detection unit Q (including the camera 7 and the imaging control unit 10d) detects the dispersion degree of the kneading material in the intermediate portion 35aM at the timings A and B. In addition, the dispersion degree detection unit Q detects the dispersion degree at any of the timings A, B, and C with regard to the dispersion degree of the kneading material at the terminal end 35bE. The dispersion degree detection unit Q may detect the dispersion degree of the kneading material at least one or more of the timings A to C.

A part of an intermediate portion 35bM of the blade portion 35b and the terminal end 35aE of the blade portion 35a are positioned at the position P2 in the rotation direction D of the rotor 3. In a case where the camera 7 is disposed so as to correspond to the position P2, the dispersion degree detection unit Q detects the dispersion degree of the kneading material at any of the timings A, B, and C for the terminal end 35aE and detects the dispersion degree of the kneading material at any of the timings A and B for the intermediate portion 35bM.

A part of the intermediate portion 35aM of the blade portion 35a and a part of the intermediate portion 35bM of the blade portion 35b are positioned at the position P4 in the rotation direction D of the rotor 3. It is assumed that the camera 7 is disposed so as to correspond to the position P4. In this case, the dispersion degree detection unit Q performs detection at least one or both of the timings A and B with regard to the intermediate portion 35aM and the intermediate portion 35bM.

In the rotation direction D of the rotor 3, only a part of the intermediate portion 35aM of the blade portion 35a is positioned at the position P3 and only a part of the intermediate portion 35bM of the blade portion 35b is positioned at the position P5. It is assumed that the camera 7 is disposed so as to correspond to the position P3 or P5. In this case, the dispersion degree detection unit Q performs detection at least one or both of the timings A and B with regard to the dispersion degree of the kneading material in the intermediate portion 35aM or the intermediate portion 35bM.

Accordingly, at the positions P1, P2, and P4, the kneading state can be detected with regard to the kneading material that is present on both the blade portion 35a side and the blade portion 35b side. Accordingly, the dispersion degree detection unit Q is capable of detecting an accurate dispersion degree based on many kneading states.

Figure 8:
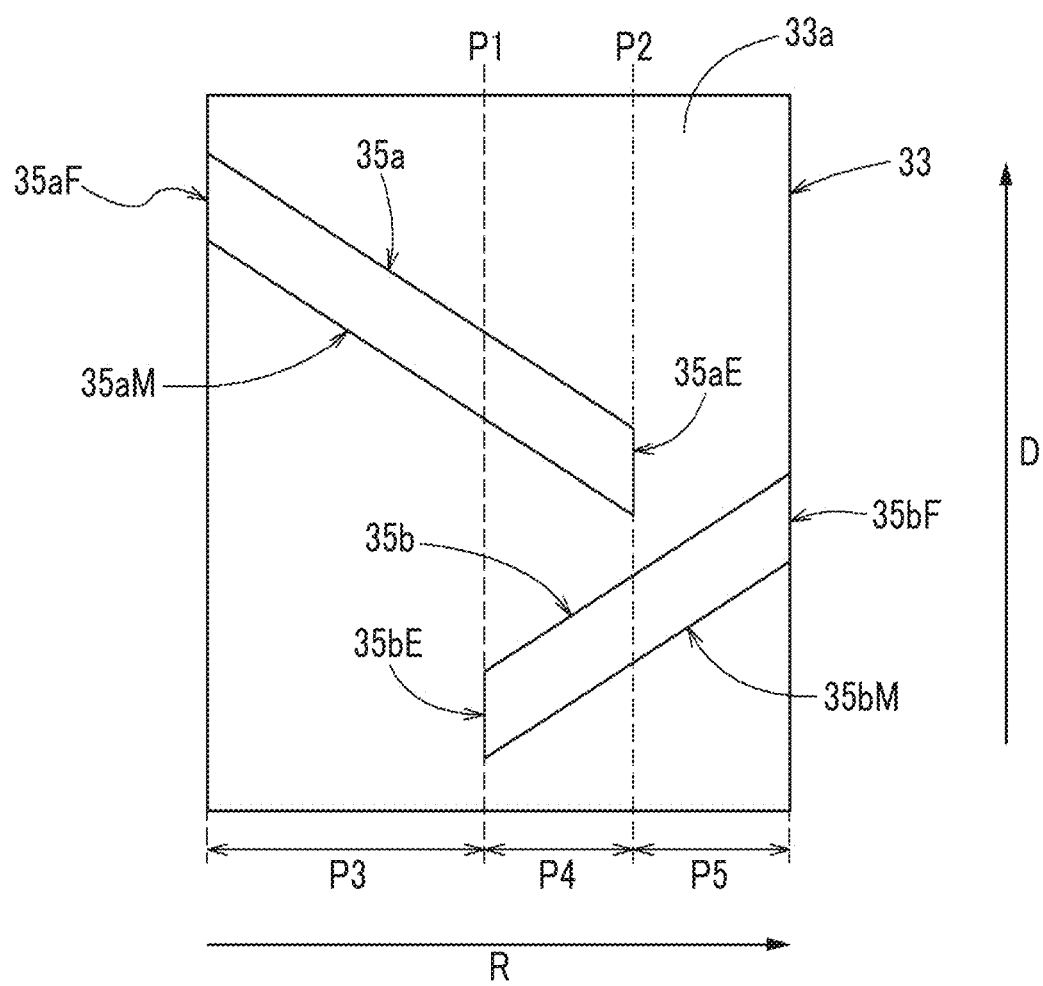
FIG. 8 is a developed schematic view of the shaft portion illustrating dispersion degree detection in a case where the blade portions have different lengths.

Although the blade portions 35a and 35b have the same length in the above description, the dispersion degree detection unit Q is capable of detecting the dispersion degree in a similar manner with regard to the blade portions 35a and 35b having different lengths as illustrated in FIG. 8. In FIG. 8, the length of the blade portion 35a is longer than the length of the blade portion 35b. This is preferable because the kneading position of the kneading material changes with diversity and the kneading is efficiently performed with ease by the lengths of the blade portions 35a and 35b being different from each other. The method for detecting the dispersion degree at the positions P1 to P5 will not be described because the method is the same as described above.

For example, the through-hole 9 along the rotation axis R may be formed long in the casing 2 and the transmission window 8 may be fitted in the through-hole 9 such that the camera 7 is capable of imaging the kneading material at any of the positions P1 to P5. In this configuration, the camera 7 can be moved to and mounted at any position of the transmission window 8 that is long in the direction of the rotation axis R.

<2> In the one embodiment described above, the transmission window 8 is directly fitted in the through-hole 9 provided in the cylindrical portion 2b of the casing 2. However, a first protection member 50 may be provided between the through-hole 9 of the casing 2 and the outer edge of the transmission window 8 as illustrated in FIGS. 9 and 10.

Although the rotor 3 rotates and the casing 2 vibrates as a result of the kneading of the kneading material or the like, the first protection member 50 reduces the impact on the transmission window 8. As a result, it is possible to suppress the loss of the transmission window 8 or the like. Although the outer edge of the transmission window 8 and the through-hole 9 of the casing 2 may come into contact with each other and the transmission window 8 may be lost when the transmission window 8 is aligned with the through-hole 9 of the casing 2, the loss of the transmission window 8 can also be suppressed by the first protection member 50.

In addition, the shape of the outer edge of the inner surface 25 of the casing 2 and the shape of the outer edge of the transmission window 8 facing the inner portion of the casing 2 coincide with each other in an arc shape. The transmission window 8 being lost by receiving pressure from the kneading material can be suppressed also by the fact that the inner surface of the transmission window 8 can be configured to be along the inner surface 25 of the casing 2 as described above, which is preferable.

Figure 10:
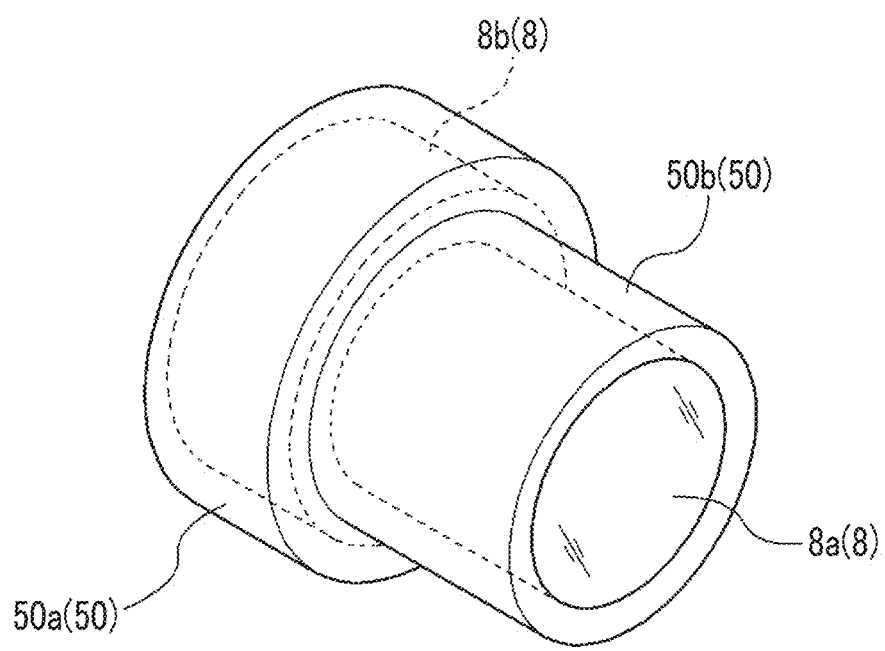
FIG. 10 is a perspective view of the transmission window and the protection member.

As illustrated in FIGS. 9 and 10, the transmission window 8 includes a small-diameter portion 8a having a small-diameter side facing the inner surface 25 of the casing 2 and a large-diameter portion 8b outside the small-diameter portion 8a. In line with this, the first protection member 50 includes a first small-diameter protection member 50a having a small diameter and a first large-diameter protection member 50b. Also, the through-hole 9 of the casing 2 is formed such that the side facing the inner surface 25 of the casing 2 has a small diameter and the outer side has a large diameter with the transmission window 8 and the first protection member 50 corresponded to. With such a configuration, it is possible to prevent the transmission window 8 and the first protection member 50 from escaping into the casing 2.

In addition, a second protection member 51 reducing the vibration that is transmitted from the casing 2 to the transmission window 8 may be provided between the casing 2 and a holding plate 53 for holding the transmission window 8 in the through-hole 9 as illustrated in FIG. 9. It is preferable that an elastic member such as a packing is used for the first and second protection members 50 and 51.

Figure 11:
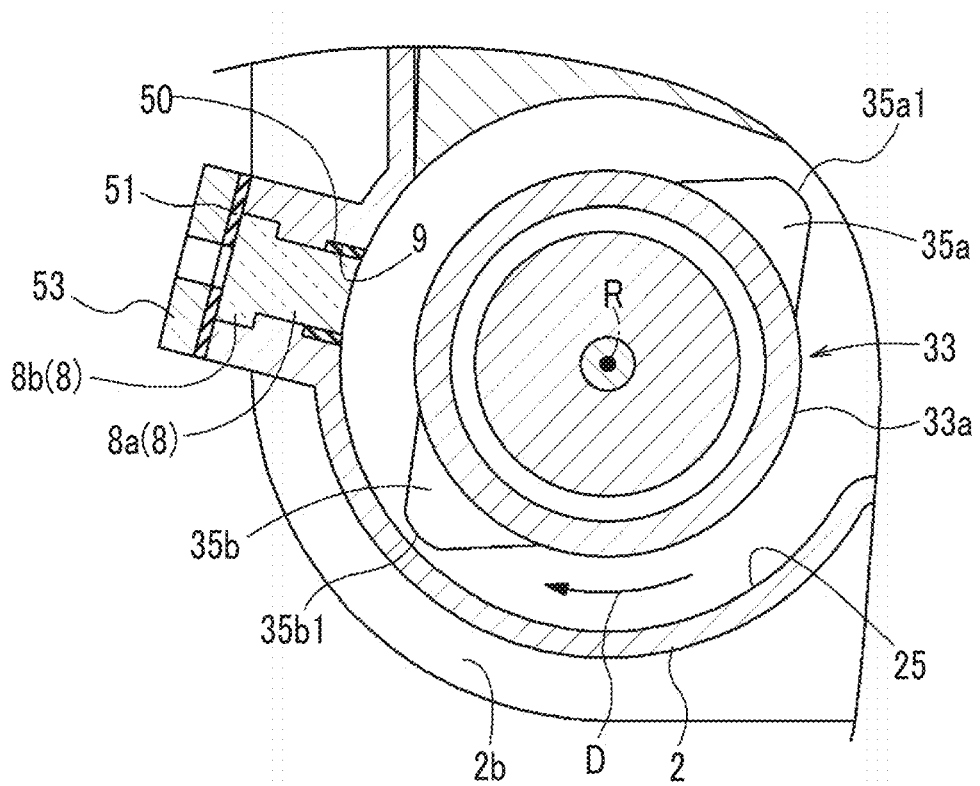
FIG. 11 is a cross-sectional view illustrating the protection member provided between the casing and the transmission window.

In addition, the first protection member 50 may be provided on at least a part of the outer edge of the transmission window 8 facing the inner portion of the casing 2 as illustrated in FIG. 11. The outer edge part of the transmission window 8 facing the inner portion of the casing 2 is a part that is likely to be lost by receiving the vibration of the casing 2. At least a part of the outer edge of the transmission window 8 facing the inner portion of the casing 2 is provided with the first protection member 50. Accordingly, the loss of the outer edge part of the transmission window 8 can be suppressed. For example, the first protection member 50 may be provided at the upper and lower ends along the rotation direction D of the rotor 3.

Figure 12:
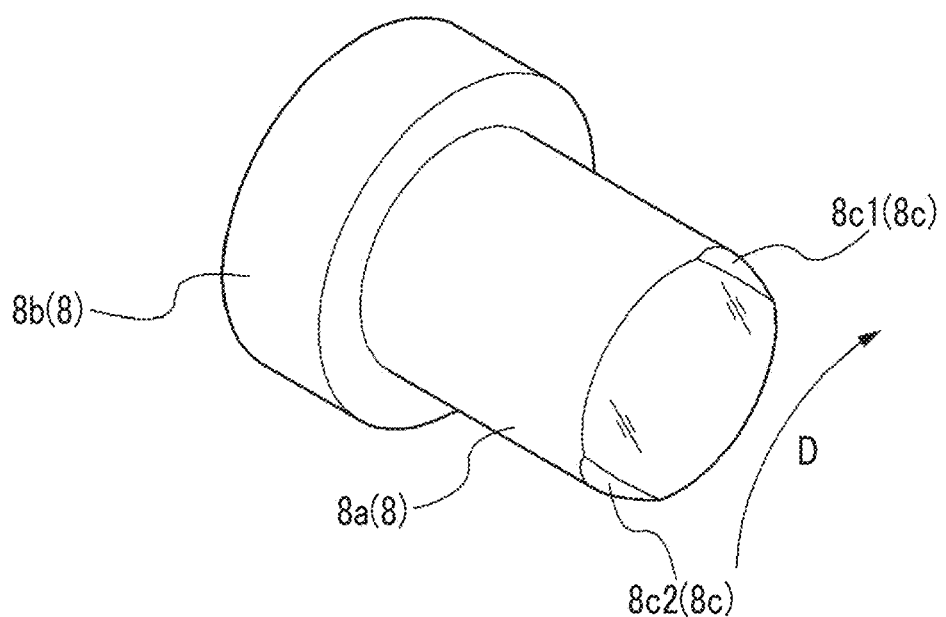
FIG. 12 is a perspective view of a chamfered transmission window.

In addition, at least a part of the outer edge of the transmission window 8 facing the inner portion of the casing 2 may be chamfered as illustrated in FIG. 12. The outer edge of the transmission window 8 facing the inner portion of the casing 2 is likely to receive the pressure from the kneading material in the casing 2 and the vibration of the casing 2 and is likely to be lost. At least a part of the outer edge of the transmission window 8 is chamfered. Accordingly, it is possible to reduce a sharp region at the outer edge of the transmission window 8 and reduce a loss attributable to vibration.

It is particularly preferable that chamfered portions 8c1 and 8c2 are formed as illustrated in FIG. 12 by both end portions of the outer edge of the transmission window 8 that are along the rotation direction D of the rotor 3 about the rotation axis R being chamfered. Here, both end portions of the outer edge of the transmission window 8 in the rotation direction D of the rotor 3 are likely to receive, for example, the pressure from the kneading material in the casing 2 and the vibration of the casing 2. In this regard, it is preferable that the chamfered portions 8c1 and 8c2 are formed in both end portions of the outer edge of the transmission window 8 in the rotation direction D of the rotor 3. Further, the kneading material pushes the transmission window 8 from the upstream side toward the downstream side along the rotation direction D of the rotor 3, and thus the downstream side of the transmission window 8 is most susceptible to the force of the kneading material in the casing 2. Accordingly, it is preferable that the chamfered portion 8c1 is formed on at least the downstream side of the outer edge of the transmission window 8 in the rotation direction D of the rotor. In a case where at least a part of the outer edge of the transmission window 8 is chamfered, the first protection member 50 may be fitted between the casing 2 and the chamfered part of the transmission window 8. Alternatively, the casing 2 may be configured to correspond to the chamfered shape of the transmission window 8 and may be configured such that no gap is generated between the chamfered part and the casing 2.

<3> In the one embodiment described above, the dispersion degree detection unit Q detects the kneading state (dispersion degree) of the kneading material based on the electromagnetic waves emitted to the surface of the kneading material and reflected from the surface of the kneading material. However, the electromagnetic waves that the dispersion degree detection unit Q detects from the kneading material are not limited thereto. For example, the dispersion degree detection unit Q may detect the kneading state (dispersion degree) of the kneading material based on the electromagnetic waves from the kneading material itself that are radiated from the surface and the inner portion of the kneading material.

<4> Although two blade portions, that is, the blade portions 35a and 35b are provided in the one embodiment described above, the number may be one or three or more.

<5> In the one embodiment described above, the light 6 and the camera 7 are disposed in the vicinity of the transmission window 8. Specifically, the light 6, the transmission window 8, and the rotor 3 have a positional relationship in which the light 6, the transmission window 8, and the rotor 3 are arranged on one straight line. The electromagnetic waves (light) from the light 6 are emitted to the kneading material by transmitting through the transmission window 8. The electromagnetic waves (light) from the kneading material reach the camera 7 by transmitting through the transmission window 8. A mirror may be disposed between the light 6 and the transmission window 8 or between the camera 7 and the transmission window 8. In other words, the electromagnetic waves (light) from the light 6 may be reflected by a mirror and incident into the transmission window 8. The electromagnetic waves (light) from the kneading material may be reflected by a mirror and reach the camera 7.

<6> In the one embodiment described above, the operation control unit 10a is configured to end the kneading operation by stopping the rotor 3 by controlling the rotor drive mechanism 20 after the dispersion degree detected by a dispersion degree detection unit 10c reaches a predetermined threshold or after the time change rate of the dispersion degree detected by the dispersion degree detection unit 10c becomes equal to or less than a predetermined threshold. In a modification of the above, the operation control unit 10a may be configured to start the next kneading process without ending the kneading operation. The next kneading process is kneading in a process different from the previous kneading. Examples of the next kneading process include a kneading process under a different condition (temperature, speed, or the like) and a kneading process performed with a material added.

<7> In the one embodiment described above, the camera 7 (a part of the dispersion degree detection unit Q) observes the electromagnetic waves from the kneading material in the casing 2 and detects the dispersion degree of the dispersoid into the polymer material based on the result of the measurement. A mode is also possible in which the control device 10 controls the operation of the kneading device 1 based on the result of the measurement with the conversion from a current value to "dispersion degree" omitted.

<8> In the one embodiment described above, the installation positions of the camera 7 and the light 6 are not limited to the casing 2 insofar as electromagnetic waves can be emitted to the kneading material via the transmission window 8 and the state of the kneading material can be imaged. For example, the camera 7 and the light 6 may be supported by a support member separate from the casing 2.

Another Embodiment

Figure 13:
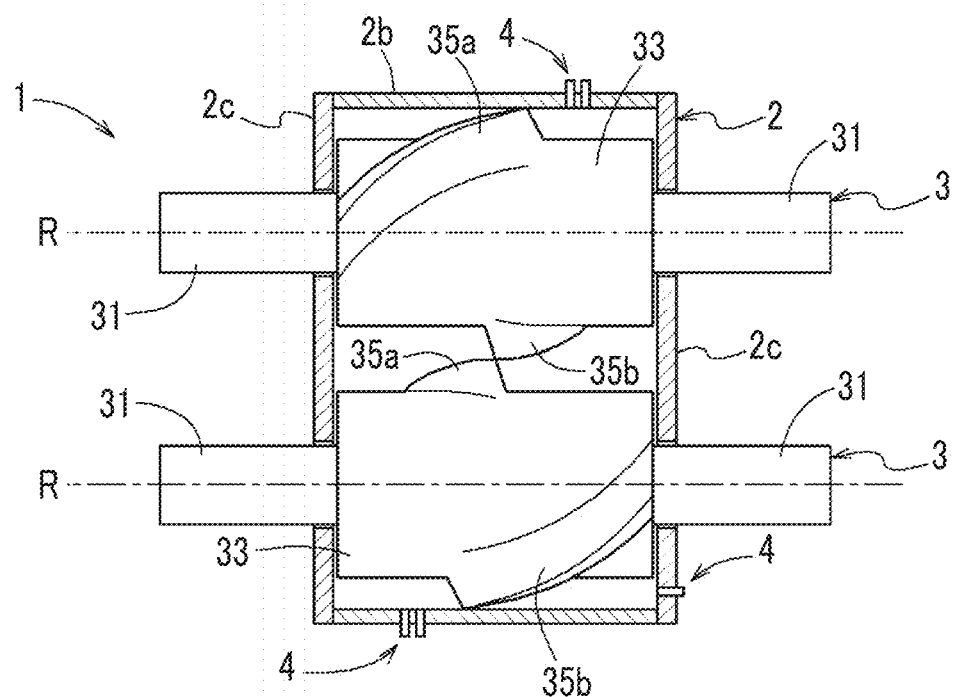
FIG. 13 is a top view illustrating a schematic configuration of the kneading device.
Figure 14:
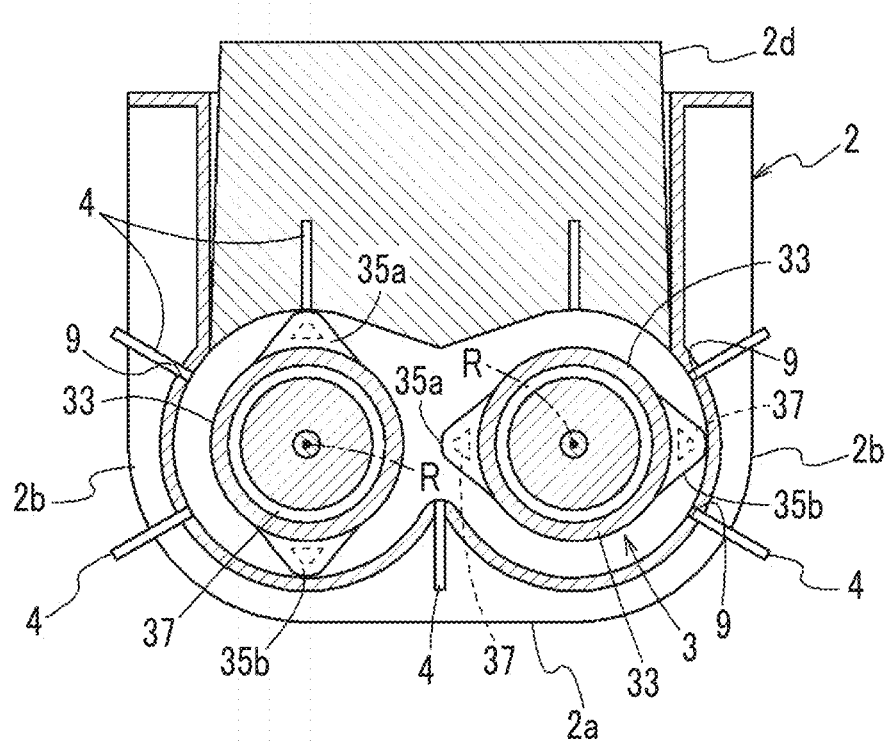
FIG. 14 is a cross-sectional view illustrating a schematic configuration of the kneading device.
Figure 15:
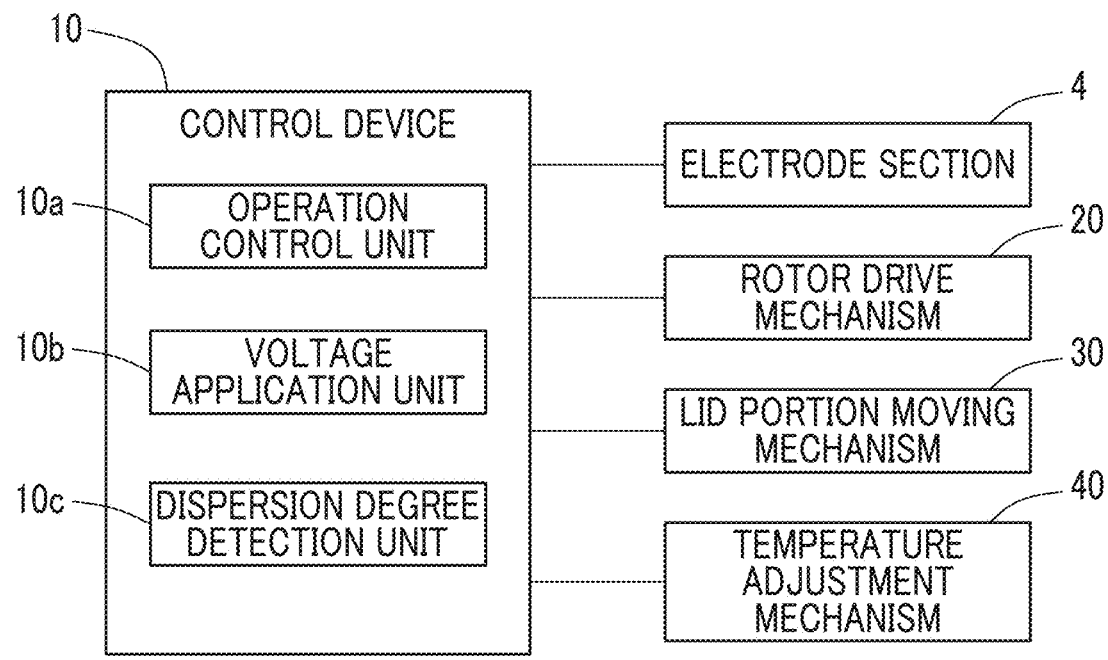
FIG. 15 is a block diagram illustrating a schematic configuration of the kneading device.

Hereinafter, the kneading device 1 according to the another embodiment will be described. Parts similar to those of the one embodiment will not be described. As illustrated in FIGS. 13 and 14, the kneading device 1 according to the present embodiment is different from the kneading device according to the one embodiment in that the light 6, the camera 7, and the transmission window 8 are not provided. In addition, in the kneading device 1 according to the present embodiment, the through-hole 9 is formed at a position different from the position of the through-hole in the kneading device according to the one embodiment. An electrode section 4 is disposed in the through-hole 9 in the kneading device 1 according to the present embodiment whereas the electrode section 4 is not provided in the kneading device 1 according to the one embodiment.

The electrode section 4 is disposed in the casing 2 and comes into contact with the kneading material in the casing 2. Specifically, the electrode section 4 is configured to include a pair of electrodes (first electrode 4a and second electrode 4b) as illustrated in FIGS. 16 to 19. The electrode section 4 is connected to the control device 10 and a predetermined measurement voltage is applied from a voltage application unit 10b of the control device 10. The dispersion degree detection unit (detection unit) 10c of the control device 10 measures the current that flows between the first electrode 4a and the second electrode 4b and detects the dispersion degree of the dispersoid into the polymer material (hereinafter, simply referred to as "dispersion degree" in some cases). Here, the detected current is a current through at least one of the surface and the inner portion of the kneading material.

The electrode section 4 is disposed in at least one of the bottom portion 2a, the cylindrical portion 2b, the side wall portion 2c, and the lid portion 2d of the casing 2. For example, the electrode section 4 may be disposed in the bottom portion 2a, the cylindrical portion 2b, the side wall portion 2c, and the lid portion 2d of the casing 2 as illustrated in FIGS. 13 and 14 or may be disposed in one of the places.

The control device 10 controls the overall operation of the kneading device 1. The control device 10 in the another embodiment is configured to include the voltage application unit 10b in addition to the operation control unit 10a provided in the control device 10 in the one embodiment. Specifically, the control device 10 is configured to include, for example, a power supply device for applying a voltage to the electrode section 4 and a measurement device for measuring the current that flows between the pair of electrodes of the electrode section 4 in addition to the HDD or the nonvolatile RAM and the CPU. The control device 10 is connected to the electrode section 4, the rotor drive mechanism 20, the lid portion moving mechanism 30, and the temperature adjustment mechanism 40, measures the current, and controls each mechanism. In the present embodiment, the dispersion degree detection unit 10c is provided instead of the imaging control unit 10d in the one embodiment. The dispersion degree detection unit 10c has a similar function in that the dispersion degree detection unit 10c detects the dispersion degree.

The operation control unit 10a controls the operation of the kneading device 1 based on the dispersion degree detected by the dispersion degree detection unit 10c (described later). The operation of the kneading device 1 based on the dispersion degree is similar to that of the one embodiment.

The voltage application unit 10b applies a predetermined measurement voltage between the pair of electrodes (first electrode 4a and second electrode 4b) of the electrode section 4. The predetermined measurement voltage is, for example, a predetermined constant voltage (such as 3 V, 8 V, and 25 V).

The voltage application unit 10b may change the predetermined measurement voltage in accordance with, for example, the magnitude of the current of the electrode section 4 measured by the dispersion degree detection unit 10c. For example, the dispersion degree detection unit 10c may change the measurement voltage such that the current flowing through the electrode section 4 has a magnitude suitable for measurement.

In a case where a conductive dispersoid (such as carbon) is dispersed into a polymer material (such as acrylic rubber), the resistance value of the kneading material increases to approximately 50 GΩ. Accordingly, the measurement voltage is preferably 3 V or more, more preferably 8V or more, and even more preferably 25 V or more. In addition, the measurement voltage is preferably 1,000 V or less.

The voltage application unit 10b may be configured such that the measurement voltage varies with the dispersion degree detected by the dispersion degree detection unit 10c. In a case where a conductive dispersoid (such as carbon) is dispersed into a polymer material (such as acrylic rubber), the electrical resistance of the kneading material increases as kneading proceeds and the dispersion degree rises. For example, the resistance of the kneading material increases as the dispersion degree rises, and thus it may be difficult to measure the current of the kneading material unless the measurement voltage is increased. Accordingly, it is preferable to configure the voltage application unit 10b such that, for example, the measurement voltage increases as the dispersion degree increases.

The voltage application unit 10b is configured to apply no measurement voltage to the electrode section 4 when the lid portion 2d is not disposed at a predetermined position. The predetermined position is, for example, a position where the lid portion 2d is lowered and the casing 2 is closed. Specifically, the voltage application unit 10b detects the position of the lid portion 2d by using the lid portion moving mechanism 30 and the voltage application unit 10b applies no measurement voltage to the electrode section 4 in a case where the lid portion 2d is positioned above a predetermined height (height at which the casing 2 is closed). This is preferable because it is possible to suppress a situation in which an operator of the kneading device 1 is electrically shocked by touching the electrode section 4.

The voltage application unit 10b is configured to apply no measurement voltage to the electrode section 4 when the rotor 3 does not rotate. Specifically, the voltage application unit 10b detects whether or not the rotor 3 rotates by monitoring the operation control unit 10a or the rotor drive mechanism 20 and the voltage application unit 10b applies no measurement voltage to the electrode section 4 when the rotor 3 does not rotate. This is preferable because it is possible to suppress a situation in which an operator of the kneading device 1 is electrically shocked by touching the electrode section 4.

The dispersion degree detection unit 10c measures the current flowing between the pair of electrodes (first electrode 4a and second electrode 4b) of the electrode section 4 and detects the dispersion degree of the dispersoid into the polymer material based on the measured current. In a case where a conductive dispersoid (such as carbon) is dispersed into a polymer material (such as acrylic rubber), the electrical resistance of the kneading material increases as kneading proceeds and the dispersion degree rises. Accordingly, it is possible to detect the dispersion degree by measuring the current flowing through the electrode section 4.

In this case, for example, the measured current value may be used as the dispersion degree as it is. When the measurement voltage that the voltage application unit 10b applies to the electrode section 4 is kept constant during kneading, the measured current value can be used as (an index indicating) the dispersion degree.

For example, the resistance value may be calculated by the measurement voltage in that case being divided by the measured current value and the resistance value may be used as the dispersion degree.

The dispersion degree detection unit 10c may be configured to calculate the dispersion degree of the dispersoid into the polymer material in the casing 2 based on the relationship between the dispersion degree and the current measured by the electrode section 4. The relationship between the current and the dispersion degree may be expressed by a mathematical formula, in the form of a table in which corresponding numerical values are written, or the like. For example, the relationship may be determined by current measurement being performed with materials with various dispersion degrees prepared and the relationship between the current and the dispersion degree being examined. For example, the dispersion degree that corresponds to the measured current value (or the resistance value) may be calculated by proportional calculation with the current value (or the resistance value) at kneading start set to zero and the current value (or the resistance value) for kneading ending determination set to 100.

The dispersion degree detection unit 10c may be configured to detect the dispersion degree by excluding a value out of a predetermined range from the measured current values. For example, the dispersion degree detection unit 10c may be configured such that the predetermined range is within ±30% with respect to the current value at a time when the kneading material is in contact with both of the pair of electrodes of the electrode section 4 and the dispersion degree is detected by a value (current value) out of the predetermined range being excluded.

The dispersion medium to be kneaded is kneaded by moving while rotating in the casing 2 with the rotor 3. Accordingly, the contact state between the dispersion medium and the electrode section 4 changes every moment. Although one or both of the pair of electrodes may be separated from the dispersion medium, the current value measured in that case greatly changes and does not reflect the state of the dispersion medium. Since the dispersion degree is detected by a value out of a predetermined range being excluded from the measured current values, the dispersion degree appropriately represents the state of the material, which is preferable.

In addition, the dispersion degree may be detected by averaging processing being performed on a measured current value that is within a predetermined range. For example, the dispersion degree detection unit 10c may be configured such that the predetermined range is within ±20% with respect to the current value at a time when the kneading material is in contact with both of the pair of electrodes of the electrode section 4 and the dispersion degree is detected by averaging processing (for example, 10-point moving average) being performed on a value within the predetermined range. This configuration is preferable because fluctuations in the dispersion degree are suppressed.

The forms of the electrode section 4 will be described in detail with reference to FIGS. 16 to 19. As described above, the electrode section 4 is configured to include the first electrode 4a and the second electrode 4b as the pair of electrodes. The first electrode 4a and the second electrode 4b are metallic round bars.

Figure 16:
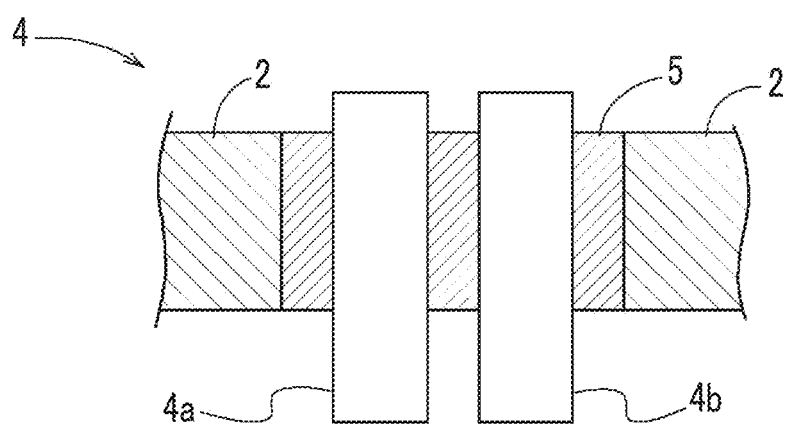
FIG. 16 is a diagram illustrating the structure of an electrode section.
Figure 17:
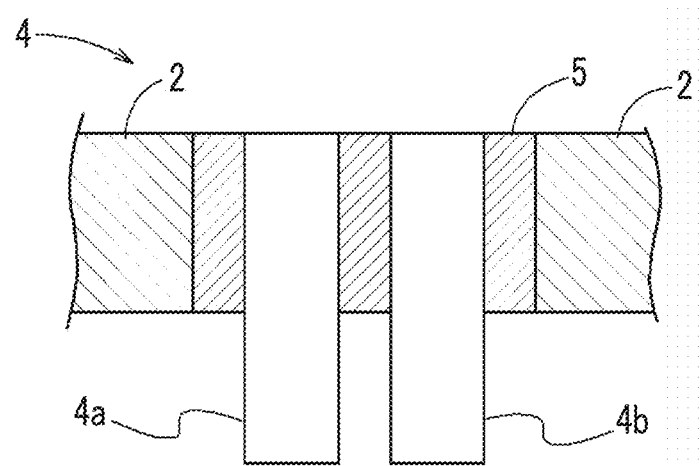
FIG. 17 is a diagram illustrating the structure of the electrode section.
Figure 18:
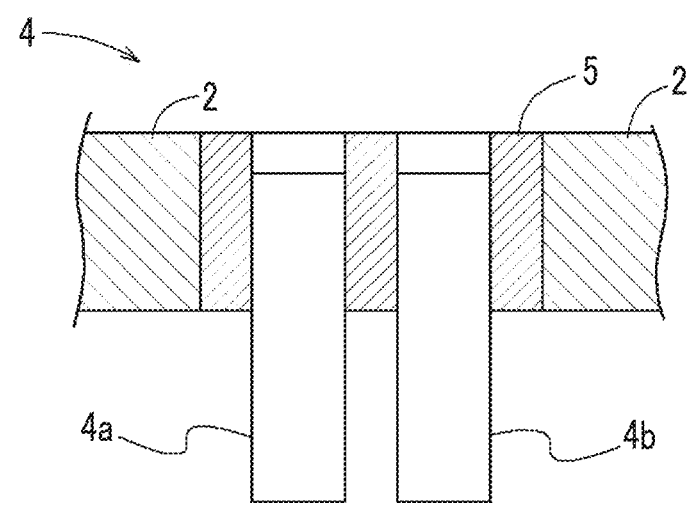
FIG. 18 is a diagram illustrating the structure of the electrode section.

In the forms illustrated in FIGS. 16, 17, and 18, the first electrode 4a and the second electrode 4b are disposed in postures in which the first electrode 4a and the second electrode 4b are parallel to each other and perpendicular to the wall surface of the casing 2. An insulating member 5 is disposed between the first and second electrodes 4a and 4b and the casing 2. The insulating member 5 is a member having a large electrical resistance and is, for example, a resinous member. In other words, the first and second electrodes 4a and 4b and the casing 2 are electrically insulated from each other by the insulating member 5 and discharge between the first and second electrodes 4a and 4b and the casing 2 is suppressed, which is preferable. In the forms illustrated in FIGS. 16 to 18, the distance between the first electrode 4a and the second electrode 4b is smaller than the distance between the first electrode 4a and the casing 2 and smaller than the distance between the second electrode 4b and the casing 2. Accordingly, discharge between the first and second electrodes 4a and 4b and the casing 2 is suppressed, which is preferable.

In the form of FIG. 16, the tip ends of the first electrode 4a and the second electrode 4b are in a state of protruding to the inside of the casing 2. In the form of FIG. 17, the tip ends of the first electrode 4a and the second electrode 4b are disposed so as to be at the same height as the inner wall surface of the casing 2, that is, so as to be flush with the inner wall surface of the casing 2. In the form of FIG. 18, tip ends of the first electrode 4a and the second electrode 4b are disposed at positions retracted from the inner wall surface of the casing 2.

In any of the forms illustrated in FIGS. 16 to 18, the tip ends of the first and second electrodes 4a and 4b come into contact with the kneading material and a current flows from one of the electrodes to the other electrode through the kneading material once the kneading material is pressed against the electrode section 4 by the rotor 3 with the measurement voltage applied to the electrode section 4. The dispersion degree of the kneading material is detected by this current being measured by the dispersion degree detection unit 10c.

In the forms of FIGS. 16 to 18, it is preferable that the pair of electrodes of the electrode section 4 is disposed side by side along the rotation axis R of the rotor 3. In other words, it is preferable that the first electrode 4a and the second electrode 4b are disposed such that the straight line interconnecting the tip ends of the first electrode 4a and the second electrode 4b is parallel to the rotation axis R of the rotor 3. The dispersion medium to be kneaded moves while rotating in the casing 2 with the rotor 3, and thus the material is highly likely to be in contact with the pair of electrodes disposed side by side along the rotation axis R at the same time and for a long time and the current can be reliably measured.

Figure 19:
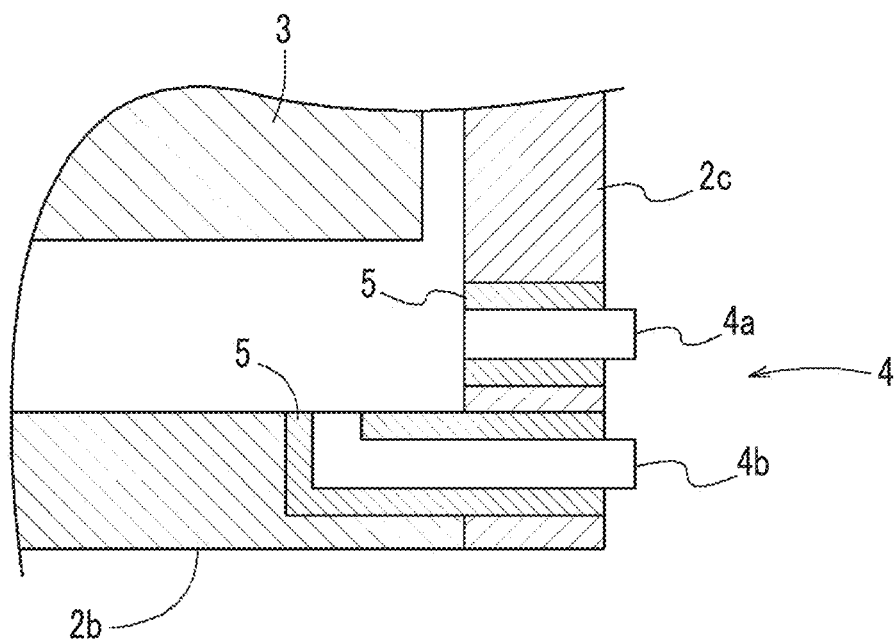
FIG. 19 is a diagram illustrating the structure of the electrode section.

In the form of FIG. 19, the first electrode 4a is disposed in the side wall portion 2c of the casing 2 such that the tip end of the first electrode 4a is flush with the inner surface of the side wall portion 2c. The second electrode 4b is disposed in the cylindrical portion 2b of the casing 2 such that the tip end of the second electrode 4b is flush with the inner surface of the cylindrical portion 2b. In other words, in the form of FIG. 19, the electrode section 4 is disposed in the connection portion between the cylindrical portion 2b and the side wall portion 2c in the casing 2.

Modification Examples

The configuration disclosed in the above-described another embodiment (including the modification examples, the same applies hereinafter) can be applied in combination with the configuration disclosed in the modification examples insofar as no contradiction arises. In addition, the embodiment disclosed in this specification is an example, the embodiment of the present invention is not limited thereto, and the embodiment can be appropriately modified without departing from the object of the present invention.

<1> In the another embodiment described above, the dispersion degree detection unit 10c measures the current that flows between the pair of electrodes (first electrode 4a and second electrode 4b) of the electrode section 4 and detects the dispersion degree of the dispersoid into the polymer material based on the measured current. A mode is also possible in which the control device 10 controls the operation of the kneading device 1 based on the measured current with the conversion from a current value to "dispersion degree" omitted.

<2> In the another embodiment described above, the operation control unit 10*a* is configured to end the kneading operation by stopping the rotor 3 by controlling the rotor drive mechanism 20 after the dispersion degree detected by the dispersion degree detection unit 10*c* reaches a predetermined threshold or after the time change rate of the dispersion degree detected by the dispersion degree detection unit 10*c* becomes equal to or less than a predetermined threshold. In a modification of the above, the operation control unit 10*a* may be configured to start the next kneading process without ending the kneading operation. The next kneading process is kneading in a process different from the previous kneading. Examples of the next kneading process include a kneading process under a different condition (temperature, speed, or the like) and a kneading process performed with a material added.

<3> In the another embodiment described above, the pair of first and second electrodes 4*a* and 4*b* of the electrode section 4 is disposed side by side along the rotation axis R of the rotor 3 and a predetermined measurement voltage is applied between the pair of first and second electrodes 4*a* and 4*b*. However, the configuration of the electrode section 4 is not limited thereto.

Figure 20:
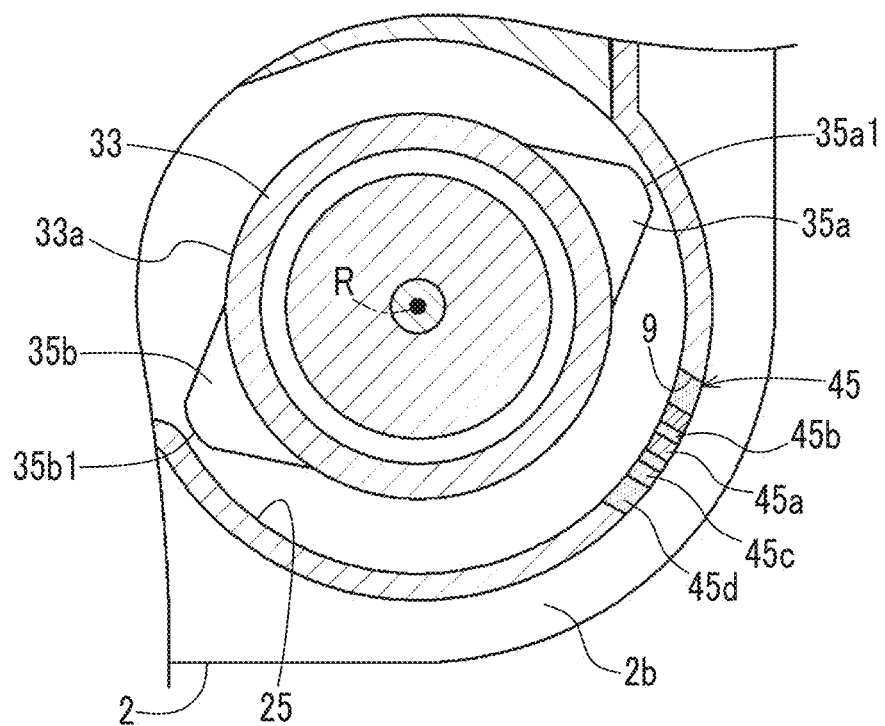
FIG. 20 is a diagram illustrating the structure of the electrode section.
Figure 21:
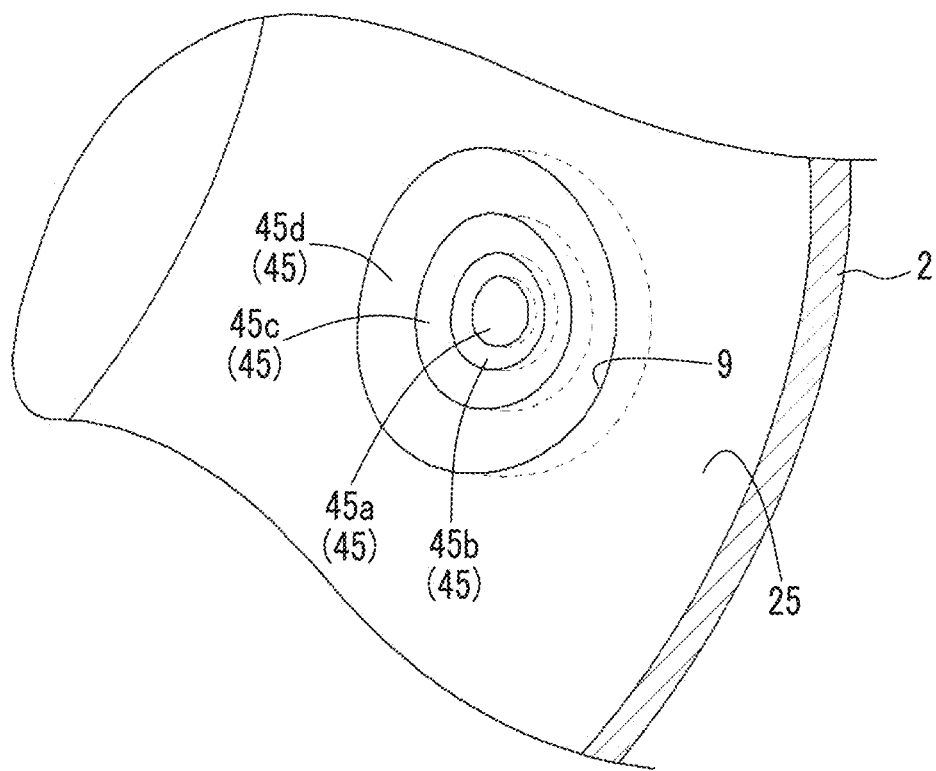
FIG. 21 is a diagram illustrating the structure of the electrode section.

The electrode section 4 may be a ring-type electrode 45 as illustrated in FIGS. 20 and 21. The ring-type electrode 45 is attached to the cylindrical portion 2*b* so as to reach the inner surface 25 from the outer side of the casing 2. The electrode 45 is formed in an annular shape and outward in the order of an inter-electrode insulating portion 45*b*, an outer ring electrode 45*c*, and an anti-electric leakage insulating portion 45*d* with an inner shaft electrode 45*a* at the center of the electrode 45. A measurement voltage is applied between the inner shaft electrode 45*a* and the outer ring electrode 45*c*. By the inner shaft electrode 45*a* and the outer ring electrode 45*c* annularly overlapping as described above, the current measurement position of the kneading material can be substantially the same position and a more accurate dispersion degree can be measured.

Figure 22:
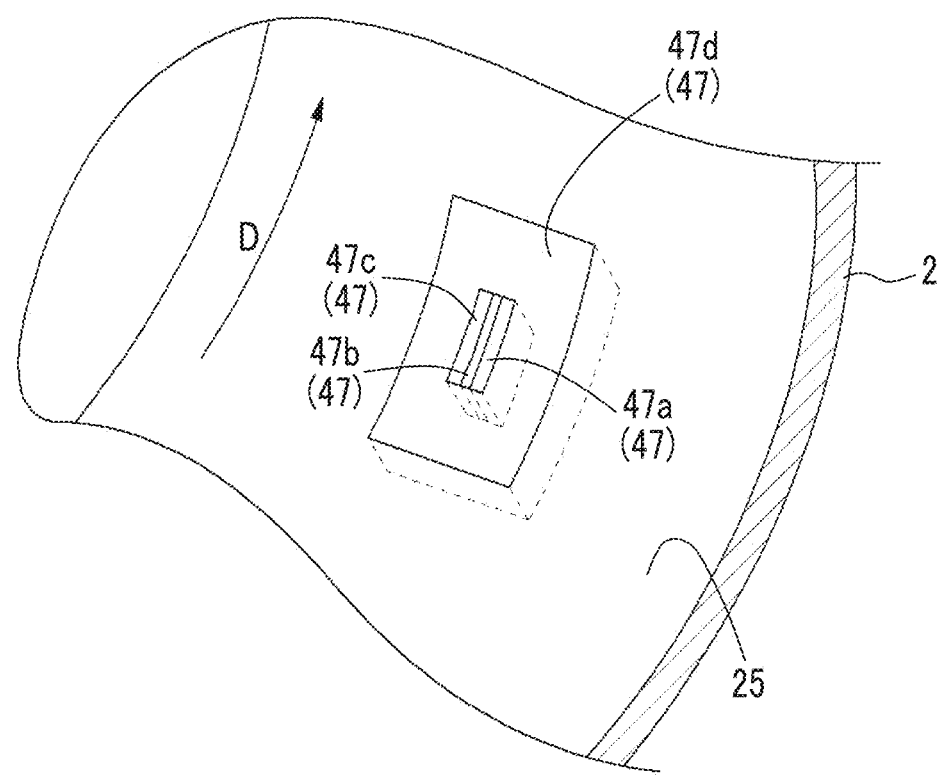
FIG. 22 is a diagram illustrating the structure of the electrode section.

In addition, as illustrated in FIG. 22, the electrode section 4 may be an electrode 47 exposed on the inner surface 25 of the casing 2 in a plate shape. The rectangular parallelepiped electrode 47 is attached to the cylindrical portion 2*b* so as to reach the inner surface 25 from the outer side of the casing 2. The electrode 47 is formed by an anti-electric leakage insulating portion 47*d* surrounding a first electrode 47*a* and a second electrode 47*c* that are disposed and integrated on both sides across an inter-electrode insulating portion 47*b*. The rotor 3 is rotationally driven in the predetermined rotation direction D and the kneading material is also kneaded in the predetermined rotation direction D. The longitudinal directions of the inter-electrode insulating portion 47*b*, the first electrode 47*a*, and the second electrode 47*c* are along the direction that is along the rotation direction D of the kneading material. Accordingly, by configuring the electrode 47 along the flow of the kneading material, it is possible to reduce the resistance applied to the electrode 47, forestall gaps between the electrodes 47 and between the electrode 47 and the casing 2, and suppress discharge.

It should be understood that the invention is not limited to the above-described embodiment, but may be modified into various forms on the basis of the spirit of the invention. Additionally, the modifications are included in the scope of the invention.

What is claimed is:

1. A kneading device comprising:
   a casing configured to:
      accommodate, within the casing during a kneading operation, a kneading material that contains a dispersion medium and a dispersoid;
   a rotor configured to:
      knead the kneading material while dispersing the dispersoid in the dispersion medium by rotating about a rotation axis; and
   a detection unit configured to:
      capture, during the kneading operation, an image of the kneading material,
      detect, in the image, a quantity of protrusions on a surface of the kneading material, the protrusions being formed by the dispersoid, and
      determine, from the detected quantity of protrusions, a dispersion degree of the dispersoid in the dispersion medium,
   wherein the rotor is disposed in the casing.

2. The kneading device according to claim 1, further comprising:
   a window in a through-hole of the casing, the through-hole extending from an outer side of the casing to an inner side of the casing.

3. The kneading device according to claim 2, wherein a surface of the window, at the inner side of the casing, is a curved surface.

4. The kneading device according to claim 3, wherein a coating on the window, at the inner side of the casing, prevents the kneading material from adhering to the surface of the window.

5. The kneading device according to claim 2, wherein the detection unit is configured to capture, through the window during the kneading operation, the image of the kneading material.

6. The kneading device according to claim 1, wherein the rotor comprises a blade portion.

7. The kneading device according to claim 6, wherein the detection unit is configured to inhibit, when the blade portion of the rotor passes through the window, capture of the image.

8. The kneading device according to claim 6, wherein an adjustment of the kneading operation is a change in a rotary speed of the rotor.

9. The kneading device according to claim 6, wherein the rotor is configured to rotate, in the casing during the kneading operation, in a manner that kneads the kneading material.

10. The kneading device according to claim 6, wherein the blade portion is disposed on a shaft portion of the rotor.

11. The kneading device according to claim 6, wherein the blade portion comprises:
    a first blade portion extending so as to have a terminal end at a part up to a second end portion with a first end portion of the rotor serving as a starting end, and
    a second blade portion extending so as to have a terminal end at a part up to the first end portion with the second end portion of the rotor serving as a starting end.

12. The kneading device according to claim 11, wherein at least parts of the first blade portion and the second blade portion overlap each other in a rotation direction of the rotor.

13. The kneading device according to claim 1, further comprising:
    a control unit configured to control, based on a difference between the dispersion degree and a target value of the dispersion degree, the kneading device in a manner that causes the kneading device to adjust the kneading operation.

14. The kneading device according to claim 13, wherein the control unit is configured to control, when the dispersion degree reaches a predetermined threshold, the kneading device in a manner that causes the kneading device to halt kneading operation.

15. The kneading device according to claim 13, wherein the control unit is configured to control, after a time change rate of the dispersion degree becomes equal to or less than a predetermined threshold, the kneading device in a manner that causes the kneading device to halt kneading operation.

16. The kneading device according to claim 13, further comprising:
a lid portion disposed on the casing,
wherein the lid portion is configured to apply, during the kneading operation, a pressurizing force onto the dispersion medium.

17. The kneading device according to claim 16, wherein the control unit is configured to control, based on a difference between the dispersion degree and the target value of the dispersion degree, the kneading device in a manner that causes the lid portion to adjust the pressurizing force.

18. The kneading device according to claim 13, further comprising:
a temperature adjustment mechanism configured to adjust, during the kneading operation, a temperature of the dispersion medium.

19. The kneading device according to claim 18, wherein the control unit is configured to control, based on a difference between the dispersion degree and the target value of the dispersion degree, the kneading device in a manner that causes the temperature adjustment mechanism to adjust the temperature.

20. The kneading device according to claim 1, wherein the dispersion degree comprises, for a mass of the dispersoid, an attribute from the group consisting of a presence of the mass, an absence of the mass, and a size of the mass.

* * * * *